United States Patent [19]

Shahidi et al.

[11] Patent Number: 5,425,956
[45] Date of Patent: Jun. 20, 1995

[54] STABILIZED COOKED CURED-MEAT PIGMENT

[76] Inventors: Fereidoon Shahidi; Ronald B. Pegg, both of Department of Biochemistry, Memorial University, St. John's, NF, Canada, A1B 3X9

[21] Appl. No.: 54,277

[22] Filed: Apr. 30, 1993

Related U.S. Application Data

[63] Continuation-in-part of Ser. No. 743,502, Aug. 9, 1991, Pat. No. 5,230,915, which is a continuation-in-part of Ser. No. 602,867, Oct. 24, 1990, abandoned.

[51] Int. Cl.⁶ .................. A23L 1/313; A23L 1/314
[52] U.S. Cl. ........................... 426/92; 426/96; 426/540; 426/647; 426/652
[58] Field of Search ............ 426/647, 652, 266, 540, 426/237, 240, 397, 404, 418, 265, 302, 310, 92, 96

[56] References Cited

U.S. PATENT DOCUMENTS

| | | |
|---|---|---|
| 2,177,519 | 10/1939 | Doyle . |
| 2,792,305 | 5/1957 | Harper .................... 426/418 X |
| 2,963,369 | 12/1960 | Urbain .................... 426/240 |
| 3,073,700 | 1/1963 | Ziegler . |
| 3,266,909 | 8/1966 | Ellis . |
| 3,857,981 | 12/1974 | Sato et al. ................ 426/265 |
| 3,867,558 | 2/1975 | Sato et al. ................ 426/265 |
| 3,899,600 | 8/1975 | Sweet ...................... 426/532 |
| 3,966,974 | 6/1976 | Bharucha et al. .......... 426/265 |
| 4,001,446 | 1/1977 | Hood ....................... 426/250 |
| 4,039,690 | 8/1977 | Bharucha et al. .......... 426/266 |
| 4,076,849 | 2/1978 | Bharucha et al. .......... 426/266 |
| 4,088,793 | 5/1978 | Bharucha et al. .......... 426/266 |
| 4,143,168 | 3/1979 | Bernotavicz .............. 426/266 |
| 4,146,651 | 3/1979 | Bharucha et al. .......... 426/265 |
| 4,262,022 | 4/1981 | Hald-Christensen et al. .. 426/32 |
| 4,279,936 | 7/1981 | Jones et al. ............... 426/265 |
| 4,293,576 | 10/1981 | Sentance .................. 426/104 |
| 4,416,909 | 11/1983 | Aversano .................. 426/265 |
| 4,559,234 | 12/1985 | Rubin et al. .............. 426/250 |
| 4,590,079 | 5/1986 | Nishimori et al. ......... 426/265 |
| 4,746,522 | 5/1988 | Wofford et al. ........... 426/243 |

FOREIGN PATENT DOCUMENTS 969859 9/1964 United Kingdom .

OTHER PUBLICATIONS

Heiligman, "Storage Stability of Irradiated Meats", *Food Technology*, Jul. 1965, pp. 114–115.

Abstract, *Can. Inst. Food Sci. Technol. J.* vol. 20. No. 5, 1987, R. Pegg & F. Shahidi, "Single-Step Preparation . . .".

Abstract, *J. Inst. Can. Sci. Technol. Ailment*, vol. 21, No. 4, 1988, F. Shahidi et al., "Some Benefits of . . .".

Abstract, *J. Inst. Can. Sci. Technol. Aliment*, vol. 22, No. 4, 1989, F. Shahidi et al., Nos. 125 and 126.

F. Shahidi et al., *Synthesis of Cooked Cured-Meat Pigment . . .*, 34th International Congress of Meat Science and Technology.

F. Shahidi, Current Status of Nitrite-Free Meat Curing Systems, 35th Int. Congress of Meat Science & Technology.

F. Shahidi et al., Flavor of Cooked Meats, *Flavor Chemistry: Trends & Developments*; ACS Symposium Series.

Abstract, *Can. Inst. of Food Sci. Technol.*, 1990, F. Shahidi et al., Composite Non-Nitrite Meat Curing Systems.

F. Shahidi et al., *Food Chemistry* 38 (1990 61–68, "Colour Characteristics of Cooked Cured-Meat . . .".

Rubin et al., *Canadian Chemical News*, Jul./Aug. 1990, A Nitrite-free Meat≧Curing System.

*Primary Examiner*—Arthur L. Corbin
*Attorney, Agent, or Firm*—Birch, Stewart, Kolasch & Birch

[57] ABSTRACT

An encapsulated powdered cooked cured-meat pigment (PCCMP) is provided herein. Such pigment comprises a mononitric oxide complex of protoporphyrin (IX) Fe (II) compound derived from red blood cells, or from a hemin intermediate, or from a derivative thereof. The pigment is encapsulated within a treating mixture consisting of: (i) a carbohydrate-based wall material selected from the group consisting starch, modified starches, a starch polymer, a starch derivative, maltodextrins, starch products, chitinous compounds, β-cyclodextrin and modified β-cyclodextrin; (ii) a binding agent selected from the group consisting of gums and glycerin; and (iii) an additional agent comprising a reducing agent, a sequestrant or mixtures thereof.

17 Claims, 9 Drawing Sheets

STABILIZED COOKED CURED-MEAT PIGMENT

1) BACKGROUND OF THE INVENTION (i) Related Invention

This application is a continuation-in-part of application Ser. No. 07/743,502 filed Aug. 9, 1991, now U.S. Pat. No. 5,230,915, which in turn is a continuation-in-part of application Ser. No. 07/602,867 filed Oct. 24, 1990, now abandoned, both of which applications are incorporated herein by reference.

(ii) Field of the Invention

This invention relates to a stabilized, cooked-cured meat pigment or encapsulated powdered cooked cured-meat pigment which is related to a non-nitrite meat preservative system.

(iii) Description of the Prior Art

Nitrite is an important meat preservative. Its incidental use dates back to ancient times and as early as 3000 BC in Mesopotamia. Presence of nitrate impurities in rock salt (crude sodium chloride) was responsible for much of the curing action. Later it became known that nitrate, through action of bacteria and by post-mortem reducing activity of muscle tissue, was converted to nitrite in the curing process. Regulated use of nitrite, as such, has been practised since the mid-1920's to ensure the safety of products, and to prevent food poisoning. Nitrite has a multifunctional role in the meat curing process. Nitrite is responsible for a reddening effect and development of the characteristic and well-loved flavor of cured-meats. Nitrite with its potent antioxidant properties eliminates the problem of warmed-over flavor development and thus extends shelf-life of cured-meat products. Most importantly, it has bacteriostatic properties which retards germination of spores and formation of the deadly neurotoxin of *Clostridium botulinum*, amongst others. Cured-meat products have been prepared for many years by treatment of fresh meat with an alkali metal nitrite-containing composition or with a composition containing a mixture of alkali metal nitrite and an alkali metal nitrate. Sodium chloride is always incorporated with nitrite in the curing mixture as well as ascorbic acid, isoascorbic acid (sometimes called erythorbic acid) or their respective salts which have been found to accelerate formation and to increase stability of cured-meat pigments. Other curing adjuncts, such as sugar, spices and polyphosphates are also sometimes present. Conventional alkali metal nitrite or nitrate/nitrite-containing curing mixtures provide quite satisfactory cures in so far as cured meat preservation, flavor and development of pink to red color characteristics of cured meats are concerned. Nitrates were at one time used alone and then one had to depend on bacterial action for their conversion to nitrite during the curing process. No practical single substitute for the nitrite ion in the curing process has yet been discovered.

In the past, many attempts have been made to control bloom (freshness appearance) in red meat. Many methods involved quick freezing and maintenance of freezing temperatures of freshly butchered carcasses or involved methods wherein vitamin C or other antioxidant solutions have been sprayed on red meat or they were dipped in such solutions in order to minimize exposure to oxygen in air. Exposure of oxygen to red meat renders it brown or dark brown in color, after a period of time, thus, leaving it less appetizing in appearance to the consumer than is generally desirable. In meat canning, the product is typically processed by grinding, cutting, chopping or the like and thorough mixing of comminuted meat with seasoning ingredients. The mixed meat, which may be partially cooked, is then placed into a sealed container (referred to hereinafter as a can) and heated to ensure complete cooking and sterilization. Heating results in coagulation and denaturation of meat protein. During cooking and canning processes, in the absence of nitrites and/or nitrates, frequently a color change will occur, typified by formation of a surface discoloration of a greenish nature which gives meat the appearance of being spoiled, even though it is commercially sterile.

For many years, alkali nitrite has been used in production of sterilized canned beef, pork, poultry and fish. Nitrite along with salt and mild-heat treatment produces witch respect to red meats, a product with stable pink color and typical cured flavor. Additionally, in non-sterilized products, nitrites inhibit growth of *Clostridium botulinum* bacteria and production of their toxins during storage. It is generally accepted that stable color produced by using nitrites and nitrates is caused by chemical reactions between nitrates and nitrites and tissue heme pigments of red meat, i.e., myoglobin and hemoglobin. Nitrate and nitrite ions by several intrinsic chemical oxidation and reduction reactions in meat become nitric oxide which reacts with myoglobin to form nitric oxide myoglobin. The latter, on heating, is transformed to nitric oxide myochromogen, a stable pink pigment which provides a pleasing color to meat. Products of this process have gained widespread acceptance amongst consumers.

Unfortunately, use of nitrite has been under considerable pressure for the past 15 years or so due to its possible reactions with amines and amino acids in meats forming carcinogenic N-nitrosamines in certain cured products under high temperatures of pan-frying. Nitrosamines, e.g. N-nitrosopyrrolidine and N-nitrosodimethylamine have been detected at <100 ppb in bacon, which has been cured with conventional curing mixtures, and which has been cooked by methods in which fat reaches relatively high temperatures. These nitrosamines however are generally not found in cured-raw products. Apparently, the temperature attained by fats in frying or equivalent cooking processes, such as broiling, grilling, microwave heating, etc., facilitates reaction of nitrites with amines to form N-nitrosamines. Consequently, methods of cooking, nitrite concentration, salt concentration, pH and presence of reductants are factors determining the potential production of N-nitrosamines. Furthermore, residual nitrite present in cured meats (5–30 ppm) upon ingestion may lead to the formation of N-nitrosamines in the stomach or may act as a cocarcinogen. Carcinogenicity of N-nitrosamines in a variety of experimental animals e.g. rodents, fish etc. has been confirmed. N-nitrosamines are regarded as a potential hazard in human food products. Thus, it is prudent to eliminate precursors of N-nitrosamine formation from curing mixtures and to develop alternatives to nitrite. The National Academy of Sciences has recommended that exposure of N-nitroso compounds to humans from nitrite-cured foods be reduced and strategies for long-term research on alternatives to nitrite usage be developed. Moreover, this is in line with the stated policy of the United States and Canadian governments.

To overcome potentially serious problems, inherent in use of nitrites, several suggestions have been made.

Firstly, efforts have been made to reduce the amount of nitrite used in the curing system as well as to develop alternative methods of meat curing. Since rate of N-nitrosamine production depends on the square of the concentration of residual nitrite in meats, a reduction in the level of nitrite addition to meats has proven to be an effective measure in reducing risk of N-nitrosamine formation. In addition, use of N-nitrosamine-blocking agents, e.g. α-tocopherol together with ascorbates, has been suggested. The N-nitrosamine problem has also led to the removal of nitrate from curing practices in North America, eliminating concern over controlling the reduction rate of nitrate to nitrite. However, the most reliable method as far as N-nitrosamines are concerned, is total elimination of nitrite from the curing process. Since the likelihood of finding a single compound to mimic all functions of nitrite is infinitely remote, efforts in the past were concentrated on developing alternatives which performed a selected function of nitrite.

Color of raw meat is primarily due to the muscle pigment myoglobin which is composed of an iron-porphyrin complex and protein globin. This iron-porphyrin complex or heme gives color to myoglobin as well as to hemoglobin and cytochrome C. The oxidation state of heme iron which binds itself to tetrapyrrole nitrogen atoms in the centre of the porphyrin ring is +2. Axial coordination sites of the iron atom are occupied by the protein globin, through its imidazole ring, and a molecule of oxygen, or water. Reaction of a nitrosating agent with myoglobin produces nitrosomyoglobin or nitric oxide myoglobin which has a bright-red color and is the pigment present in cured meat prior to heat processing. Nitrosomyoglobin is very stable in the absence of oxygen, however in its presence, stability of the pigment is limited by the rate of dissociation of the nitric oxide complex. Since oxygen is believed not to react directly with bound nitric oxide, the complex has a half-life of several hours at room temperature. The final pink color of nitrite cured-meat is due to the cooked cured-meat pigment, [CCMP]. It has been shown that during heat processing, the globin fraction of myoglobin is denatured and may then be replaced by a second nitric oxide molecule. The pathways below represent possible reactions and intermediates involved in the production of the cooked cured-meat pigment from myoglobin and nitrite, where P signifies protein and where hemoglobin may replace myoglobin.

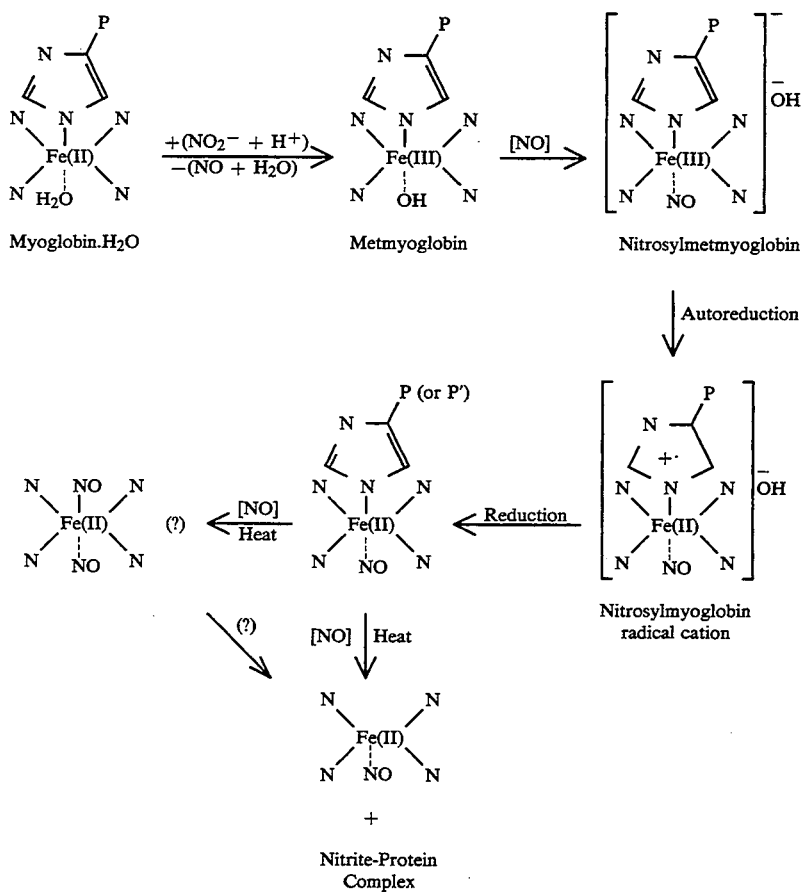

The reactions of myoglobin and hemoglobin with a nitrosating agent are shown below.

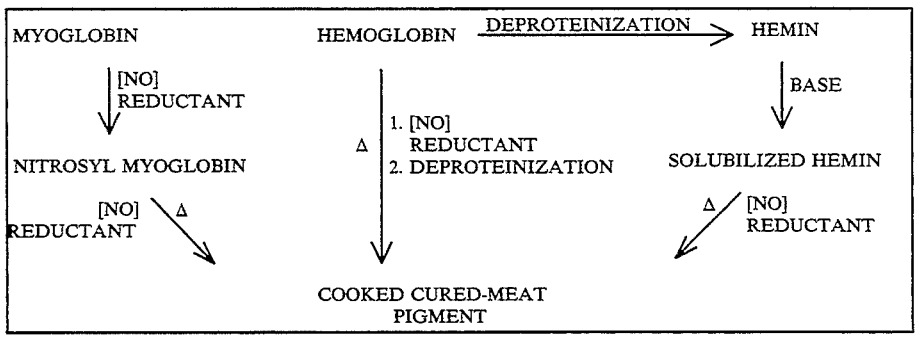

Since the characteristic pink color of cured meats has a special role in consumer acceptance, as it is usually associated with quality of processed meats, it is desirable to preserve this color attribute of the product without use of nitrites and nitrates which may form carcinogens. Nitrites and/or nitrates used in canned, heat sterilized meats are obviously not necessary as antibacterial agents, but serve primarily as color preservatives. A large number of colorants to substitute nitrite has been examined to reproduce the color of cooked cured-meat in nitrite-free curing systems. Nicotinic acid, nicotinamide, and their derivatives are examples of compounds that form complexes with myoglobin, or heme compounds, which are similar in color to the pigment in cured meats. Although a number of patents has been granted for these particular substitutes, a common problem has prevented their commercial use. These heme complexes are generally less stable than the nitric oxide complex of cooked cured-meat pigment and as such are more susceptible to oxidation. Furthermore, many of the colorants tested to mimic cured-meat color have toxicity and health-related problems and as such their use in meat processing is undesirable. For instance, substances derived from nicotinic acid are potent vasodilators for small blood vessels. Some of the key patents mentioned above to preserve color of fresh and processed meats are summarized below.

U.S. Pat. No. 2,177,519 provided a neutralizing agent, preferably an innocuous alkali metal salt of a weak acid, e.g., an alkali metal aluminate, to inhibit discoloration of ground or exposed meat due substantially or entirely to the presence of methemoglobin which is formed by oxidation of ferrous hemoglobin in order to preserve the red color of fresh meat and natural flavor thereof.

A process of preserving natural color of fresh meat in U.S. Pat. No. 3,266,909 comprised subjecting the meat to contact with an aqueous solution consisting essentially of water, at least 2.0 wt. percent of gelatin, at least 0.5 wt. percent of a reductant, and at least 2.0 wt. percent of a neutral alkali metal salt of glutamic acid.

The patent teaches that addition of certain γ-pyrones to raw comminuted red meats inhibits change in color which normally takes place during storage of raw ground red meats. In U.S. Pat. Nos. 3,867,588 and 3,867,981, use of several pyrones, namely 3-hydroxy-2-methyl-γ-pyrone and 3-hydroxy-2-ethyl-γ-pyrone, to preserve the red color of raw meat was disclosed. The process specifically required incorporation and thorough mixing of a γ-pyrone into ground meat and subsequent refrigeration for 24 h or more. The patentees stressed that the process involved treatment of fresh, raw, uncured, red meat only and that no cooking took place during the process, noting that cooking brought on a different transformation of color. Curing of meat was not specifically involved in this process.

In U.S. Pat. No. 3,899,600 the patentee taught nitrite-free multicomponent meat curing systems consisting of an antioxidant or a chelator, an antimicrobial agent and a food colorant, e.g. erythrosine in preparation of comminuted products.

The invention in U.S. Pat. No. 3,899,600 involved a meat composition to replace nitrite in the production of comminuted cured-meat products. This composition consisted of ground beef and pork containing water, sodium chloride, sucrose, a colorant (erythrosine), an antimicrobial agent (methyl paraben), and an antioxidant and a sequestrant, namely TBHQ and STPP.

In U.S. Pat. No. 3,966,974, the patentees were concerned with replacing sodium nitrite with organic nitrites.

In U.S. Pat. No. 4,001,446, a process for forming a stabilized red color in an animal protein source containing iron was provided. This process comprised: obtaining at least one animal protein source selected from the group consisting of meat, blood, and a meat by-product; forming a slurry, dispersion, or suspension of the protein source; adding at least one edible reducing agent to the protein source wherein the reducing agent comprises up to 2% by weight of the protein source, and whereby iron content of the protein source was maintained in the ferrous state; agitating the slurry dispersion, or suspension of the protein source; reacting the protein source with carbon monoxide sufficiently to achieve at least 10% saturation to form a retort- and color-stabilized protein source; and recovering the retort- and color-stabilized protein source.

In U.S. Pat. Nos. 4,039,690, 4,076,849, 4,086,561 and 4,088,793, the patentees were concerned with various aspects of control of nitrosamine production in nitrite-cured meats, particularly bacon.

U.S. Pat. No. 4,262,022 provided a process for producing a decolorized edible material from blood by hemolyzing a red blood corpuscle containing blood fraction; then partially hydrolyzing the hemolyzed blood fraction enzymatically with the proteinase of *Bacillus licheniformis* to a degree of hydrolysis of at least 10, forming thereby a hydrolyzate constituted of a decolorized supernatant containing partially hydrolyzed edible protein dissolved therein and a sludge; and thereafter deactivating the proteinase and recovering the supernatant. Heme compounds were a by-product in this process.

In U.S. Pat. No. 4,279,936, a method for preserving pink meat color in canned, cooked "red" meat, in the absence of nitrites or nitrates, was provided by adding to meat selected quantity of γ-pyrones at one or more of the various stages of curing, cooking and canning processes, and in some instances, also in connection with addition of iron salts was provided.

U.S. Pat. No. 4,293,576 provided a process for producing a food product simulating meat from an anticoagulant-treated, coagulable blood fluid by controlled, chemically-stimulated coagulation of the blood fluid under controlled temperature conditions, by the steps of: coagulating an anticoagulant-treated, coagulable blood fluid, whole animal blood, a plasma phase of animal blood, a mixture of a hemoglobin phase of animal blood and a plasma phase of animal blood, a mixture of whole animal blood and a plasma phase of animal blood; a mixture of whole animal blood and a hemoglobin phase of animal blood or a mixture of whole animal blood, a plasma phase of animal blood and a hemoglobin phase of animal blood, in the presence of an exudation-inhibiting agent and a coagulation stimulant, both present in effective amounts, while maintaining the blood fluid at a temperature within about 10° C., either above or below the physiological temperature of the animal from which blood has been derived to chemically induce coagulation, and then recovering the resultant coagulate.

The patentees, in U.S. Pat. No. 4,599,234, provided compositions for curing meats comprising (di)nitrosyl ferrohemochrome and at least one antioxidant, at least one sequestering agent and at least one antimicrobial agent. Such compositions were said to bestow similar color, flavor, and microbiological stability as that associated witch nitrite-treated meats.

The invention in U.S. Pat. No. 4,559,234 involved meat compositions comprising the preformed (di)nitrosyl ferrohemochrome, and at least one antioxidative agent, at least one sequestering agent and at least one antimicrobial agent. Suitable antioxidants included dl-α-tocopherol, butylated hydroxyanisole (BHA), butylated hydroxytoluene (BHT), propyl gallate (PG), trihydroxybutyrophenone (THBP), nordihydroguaiaretic acid (NDGA), t-butylhydroquinone (TBHQ), catechol, gum guaiac, lecithin, dilauryl thiodipropionate, ascorbic acid (AA), physiologically acceptable salts of ascorbic acid, erythorbic acid, ascorbyl palmitate, and ascorbyl acetal. Suitable sequestering agents included monosodium phosphate, disodium phosphate, sodium hexametaphosphate (SHMP), sodium tripolyphosphate (STPP), sodium pyrophosphate (SPP), citric acid (CA), monoglyceride citrate, 8-hydroxyquinoline, sodium gluconate, catechol, ethylenediamine tetraacetic acid (EDTA), disodium ethylenediamine tetraacetate (Na$_2$EDTA), diethylenetriamine pentaacetic acid (DPTA), and salicylic acid. Suitable antimicrobial agents included sodium hypophosphite (SHP), potassium sorbate and propyl parahydroxybenzoate (propyl PARABEN$_{TM}$), methyl fumarate, dimethyl fumarate, ethyl fumarate, and diethyl fumarate. Of particular interest were compositions comprising (di)nitrosyl ferrohemochrome; antioxidant agents selected from the group consisting of sodium astorbate, ascorbyl acetal, ascorbyl palmirate, TBHQ, BHA, and BHT; and sequestering agents selected from the group consisting of STPP, SHMP, EDTA and DPTA. Such compositions may comprise (a) (di)nitrosyl ferrohemochrome; (b) an antioxidant; (c) a sequestering agent; and (d) an antimicrobial agent. In such compositions the weight-to-weight ratios were: (b)/(a) below 64 (preferably 2 to 16); (c)/(a) below 160 (preferably about 40) for a non-phosphate sequestering agent and below 1000 (preferably about 240) for a phosphate sequestering agent; and (d)/(a) below 1000 (preferably about 240). Such compositions may be in the form of a premix or kit of components in proportions appropriate; for particular applications. The above-mentioned compositions may be mixed with water, with salt and sugar, and with water, salt and sugar.

U.S. Pat. No. 4,746,522 provided a composition for treating meat to reduce moisture loss incurred during cooking by the use of an acetic acid solution, gelatin, starch, sodium chloride, a phosphate salt, and non-halogenated water.

2) SUMMARY OF THE INVENTION (i) Aims of the Invention

As it has already been explained and as a result of concerns over possible health hazards associated with nitrite, there has been considerable effort either to eliminate nitrite from cured meats, or to lower its level of addition, in hope of reducing potential nitrosamine formation. Hence, the principal objective of the present invention is to provide an agent for preserving the pink meat color in canned, cooked "red" meat, in emulsion-type and solid cut products in the absence of nitrites and/or nitrates.

Another object of this invention is the direct preparation of the cooked cured-meat pigment (CCMP) from red blood cells (hemoglobin) using solutions containing a nitrosating agent (nitric oxide or nitrite) and a reductant.

Still another object of this invention is the use of a nitric oxide atmosphere or solutions saturated with it in preserving and storing CCMP.

Yet another object of this invention is the encapsulation or protection of the CCMP, referred to as powdered cooked cured-meat pigment (PCCMP) in wall materials.

Yet a further object of this invention is the use of CCMP stored under vacuum or a nitric oxide atmosphere or in the PCCMP form.

Still another object of this invention is the use of CCMP together with any one or combination of two or more of the following—ascorbic acid, erythorbic acid, citric acid, their salts, their derivatives, tocopherols, with or without any phosphate or polyphosphate or their combination(s).

A still further object of this invention is the use of CCMP, or its precursors or its derivatives, with binders containing natural antioxidants of phenolic nature or other types of plant or synthetic origin.

Another object of this invention is the use of CCMP alone or together with spice(s), their extracts, their oleoresins and/or their naturally-occurring antioxidant combinations.

A further object of this invention is the use of CCMP with or without low to medium-dose γ-irradiation (0–50 kGy) or electron irradiation with or without (an) antimicrobial agent(s).

A still further object of this invention is the use of CCMP, whatever its chemical structure might be, its derivatives and/or any mono- or dinitrosyl complex of protoporphyrin (IX) Fe (II) compounds under conditions and as in products or combinations.

(ii) Statement of Invention

This invention provides an encapsulated powdered cooked cured-meat pigment (PCCMP), comprising a mononitric oxide complex of protoporphyrin (IX) Fe (II) compound derived from red blood cells, from a hemin intermediate, or from a derivative thereof, the pigment being encapsulated within a treating mixture consisting of: (i) a carbohydrate-based wall material selected from the group consisting starches, modified starches, starch polymers, starch derivatives, maltodextrins, starch products, chitinous compounds, β-cyclodextrin and a modified β-cyclodextrin; (ii) a binding agent selected from the group consisting of gums and glycerin; and (iii) at least one member selected from the group consisting of a reducing agent and a sequestrant.

(iii) Other Features of the Invention

By one additional feature of this invention, encapsulated powdered cooked cured-meat pigment (PCCMP) is produced by reaction of a hemin intermediate or of a derivative thereof with a nitrosating agent and at least one reductant. In such feature, the hemin intermediate or derivative thereof may be provided by one of the following processes: (a) extracting such hemin intermediate or derivative thereof from red blood cells using acidified salt solutions with or without an organic solvent, (b) obtaining the hemin intermediate or derivative thereof as a by-product in globin hydrolysate preparation; and (c) obtaining the hemin intermediate or derivative thereof by chromatographic separation through carboxymethylcellulose.

By another feature of this invention, the nitrosating agent is nitric oxide, a nitrite salt, a nitrate salt, or mixtures thereof.

By still another feature of this invention, (iii) is a reducing agent selected from the group consisting of: ascorbyl palmitate; ascorbic acid; erythorbic acid; ascorbyl palmitate+ascorbic acid; ascorbyl palmitate+erythorbic acid; and ascorbic acid+erythrobic acid; and salts thereof.

By yet a further further feature of this invention, (iii) is a sequestrant agent selected from the group consisting of: butylated hydroxyanisole; butylated hydroxytoluene; t-butylhydroquinone; sodium tripolyphosphate; sodium pyrophosphate; sodium acid pyrophosphate; sodium hexametaphosphate; sodium ethylenediaminetetracetic acid; sodium tripolyphosphate+sodium ascorbate; sodium tripolyphosphate+sodium ascorbate+butylated hydroxyanisole; sodium tripolyphosphate+sodium ascorbate+t-butylhydroquinone; sodium pyrophosphate+sodium ascorbate; sodium acid pyrophosphate+sodium ascorbate; sodium hexametaphosphate+sodium ascorbate; and sodium acid pyrophosphate+sodium ascorbate+t-butylhydroquinone.

By yet another feature of this invention, the carbohydrate based wall material in the treating mixture is selected from the group consisting of: β-cyclodextrin, a modified β-cyclodextrin, a maltodextrin, a modified starch, and mixtures thereof.

By another feature of this invention, the treating mixture is selected from the group consisting of: modified starches+gum acacia; modified starches+β-cyclodextrin; modified starches+β-cyclodextrin+gum acacia; modified starches+modified β-cyclodextrin+gum acacia; modified starches+sodium tripolyphosphate+sodium acid pyrophosphate+ascorbyl palmitate; modified starches+β-cyclodextrin+sodium tripolyphosphate+sodium acid pyrophosphate+ascorbyl palmitate; modified starches+β-cyclodextrin+gum acacia+sodium tripolyphosphate+sodium acid pyrophosphate+ascorbyl palmitate; β-cyclodextrin+gum acacia; β-cyclodextrin+sodium tripolyphosphate+sodium acid pyrophosphate; β-cyclodextrin+sodium tripolyphosphate+sodium acid pyrophosphate+ascorbyl palmitate; β-cyclodextrin+gum acacia+sodium tripolyphosphate+sodium acid pyrophosphate; a modified β-cyclodextrin+sodium tripolyphosphate+sodium acid pyrophosphate+ascorbyl palmitate; maltodextrins+β-cyclodextrin+sodium tripolyphosphate+sodium acid pyrophosphate+ascorbyl palmitate; and maltodextrins+a modified β-cyclodextrin+sodium tripolyphosphate+sodium acid pyrophosphate+ascorbyl palmitate.

By still another feature of this invention, (iii) also includes an antimicrobial agent selected from the group consisting of: sodium hypophosphite; potassium sorbate; fumarate esters; t-butylhydroquinone; sodium hypophosphite+sodium ascorbate+sodium tripolyphosphate+t-butylhydroquinone; potassium sorbate+sodium ascorbate+sodium tripolyphosphate+t-butylhydroquinone; and monomethyl fumarate+sodium ascorbate+sodium tripolyphosphate+t-butylhydroquinone.

By a still further feature of this invention, (iii) also includes an antioxidant selected from the group consisting of: ascorbic acid, citric acid, $\alpha,\beta,\gamma$ or $\delta$ tocopherols; ascorbic acid+$\alpha,\beta,\gamma$ or $\delta$ tocopherols; and ascorbic acid+citric acid.

By yet another feature of this invention, (iii) also includes a plant phenolic compound as such or present in plant proteins selected from the group consisting of ellagic acid, eugenol, isoeugenol, quercetin, kaempferol, rutin, cinnamic acid, coumaric acid, ferulic acid, caffeic acid, vanillic acid, gallic acid, syringic acid, chlorogenic acid and 3,5-dimethoxy-4-hydroxycinnamic acid.

By still another feature of this invention, (iii) also includes a spice or a spice oleoresin selected from the group consisting of clove, sage, rosemary, oregano, thyme, ginger, clove oleoresin, oregano oleoresin, sage oleoresin, ginger oleoresin, thyme oleoresin, and rosemary oleoresin.

By a still further feature of this invention, the encapsulated cooked cured-meat pigment is treated with low- to medium-dose gamma- or electron-irradiation of up to about 50 kGy.

By another feature of this invention, the encapsulated powdered cooked cured-meat pigment, as described above, is preserved and stored in a dark container in an atmosphere selected from the group consisting of an oxygen-free atmosphere, an inert gas atmosphere, and a mixture of inert gases.

By another feature of this invention, the encapsulated powdered cooked cured-meat pigment, as described above, is preserved and stored in a dark container under vacuum or reduced pressure.

By another feature of this invention, the encapsulated powdered cooked cured-meat pigment, as described above, is preserved and stored in a dark container kept at room temperature or at a refrigerated temperature or at a frozen temperature.

(iv) General Features of the Invention

A system has been provided which consists of the preformed cooked cured-meat pigment (CCMP), or encapsulated powdered cooked cured-meat pigment (PCCMP), an antioxidant and/or a chelator as well as a known antimicrobial agent, which confers the characteristic cured-meat color, flavor and microbial stability to meats. As described in the prior art, this work was carried out in three phases. In the first phase, CCMP was prepared in good yield and purity. Application of CCMP to meat produced a pink color indistinguishable from that caused by nitrite after cooking. In the second phase, a large number of antioxidants and sequestrants were tested and several promising substances which have the same antioxidant effect as nitrite, were found thus controlling oxidative rancidity in meat products. This was believed to be closely related to production of cured-meat flavor. It was also found that CCMP has its own antioxidative properties. In the third phase it was found that the required antimicrobial activity of systems could be attained by incorporating antimicrobial agents, e.g. sodium hypophosphite, potassium sorbate, or fumarate esters, perhaps together with t-butylhydroquinone (TBHQ) or simply by their irradiation.

As has already been pointed out, color of hemoglobin is due to presence of "heme" groups. Thus, in the investigations leading to the present invention hemin was isolated from bovine or porcine blood, after plasma separation, and then it was reacted with sodium nitrite or nitric oxide to preform the cooked cured-meat pigment. Hemin may be extracted from red blood cells according to established procedures using acidified salt solutions. It may also be produced as a by-product of globin hydrolysate preparation or by chromatographic separation through carboxymethylcellulose. Upon dissolution of hemin in aqueous solutions, a nitrosating agent was introduced to the mixture in the presence of a reductant upon which CCMP was obtained quantitatively in a pure form. This pigment was, in one example, added to comminuted pork systems.

Since there was no free nitrite in the system, there was no chance for N-nitrosamine formation in meats treated with CCMP. This will be described below in the detailed example using systems including CCMP, in the absence of nitrite.

By another variant of this invention CCMP was also prepared by a novel, single-step process from beef red blood cells which did not use or used only small volumes of organic solvent(s). Beef red blood cells were added to a basic aqueous solution of sodium nitrite and a reductant or to a basic solution containing a reductant and into which a nitrosating agent was simultaneously added. Heat treatment of the mixture allowed denaturation and detachment of globin protein from the "heme" portion of the molecule. Subsequent nitrosation of the "heme" group with nitric oxide produced CCMP. It is believed that this would be a suitable industrial process as it is much less labor-intensive than the two-step process and may be economically more attractive.

It is also possible to remove remaining CCMP pigment in globin by its extraction into a small amount of acetone. However, for commercial utilization it may be more economical to precipitate out all CCMP in the mixture by acid treatment, during or after heating, and then extract it into a small volume of an organic solvent such as acetone. Solvent may then be removed at low temperatures since CCMP is not very stable in organic solvents, particularly at elevated temperatures. Production of CCMP by reaction of myoglobin and hemoglobin with a nitrosating agent by these two approaches is summarized below in the following examples.

The present invention will now be described.

3) BRIEF DESCRIPTION OF THE DRAWINGS

In the accompanying drawings,

FIG. 1 is a graph of the absorption spectra of pre-formed pigment in 4:1 (v/v) acetone:water— —; acid hematin— - — - —, in which absorption is shown as the ordinate, and wavelength ($\lambda$) is shown as the abscissa;

FIG. 2 is another graph of the absorption spectra of preformed pigment and other extracted pigments in various media in which absorption is shown as the ordinate and wavelength ($\lambda$) is shown as the abscissa; Absorption spectra: ---------, pre-formed pigment in 4:1 (v/v) acetone:water ~~~~~~~, PP-IX in 4:1 (v/v) acetone:water;— - — -, pigments extracted from pigment-treated cooked meat; — — —, pigments extracted from nitrite-cured meat; - — - — -, pigments extracted from PP-IX-treated cooked meat;

Figure 7:
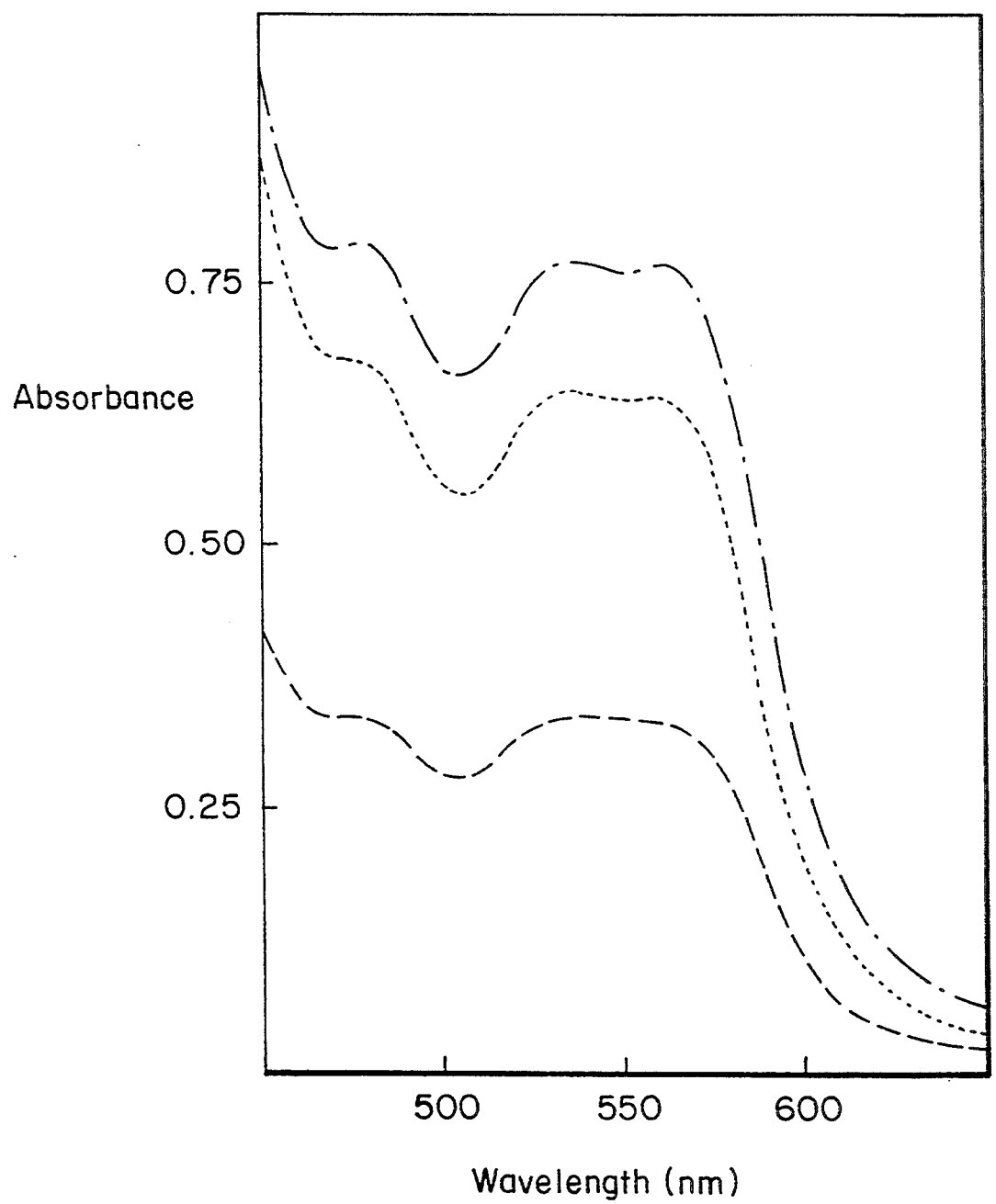
Figure 8:
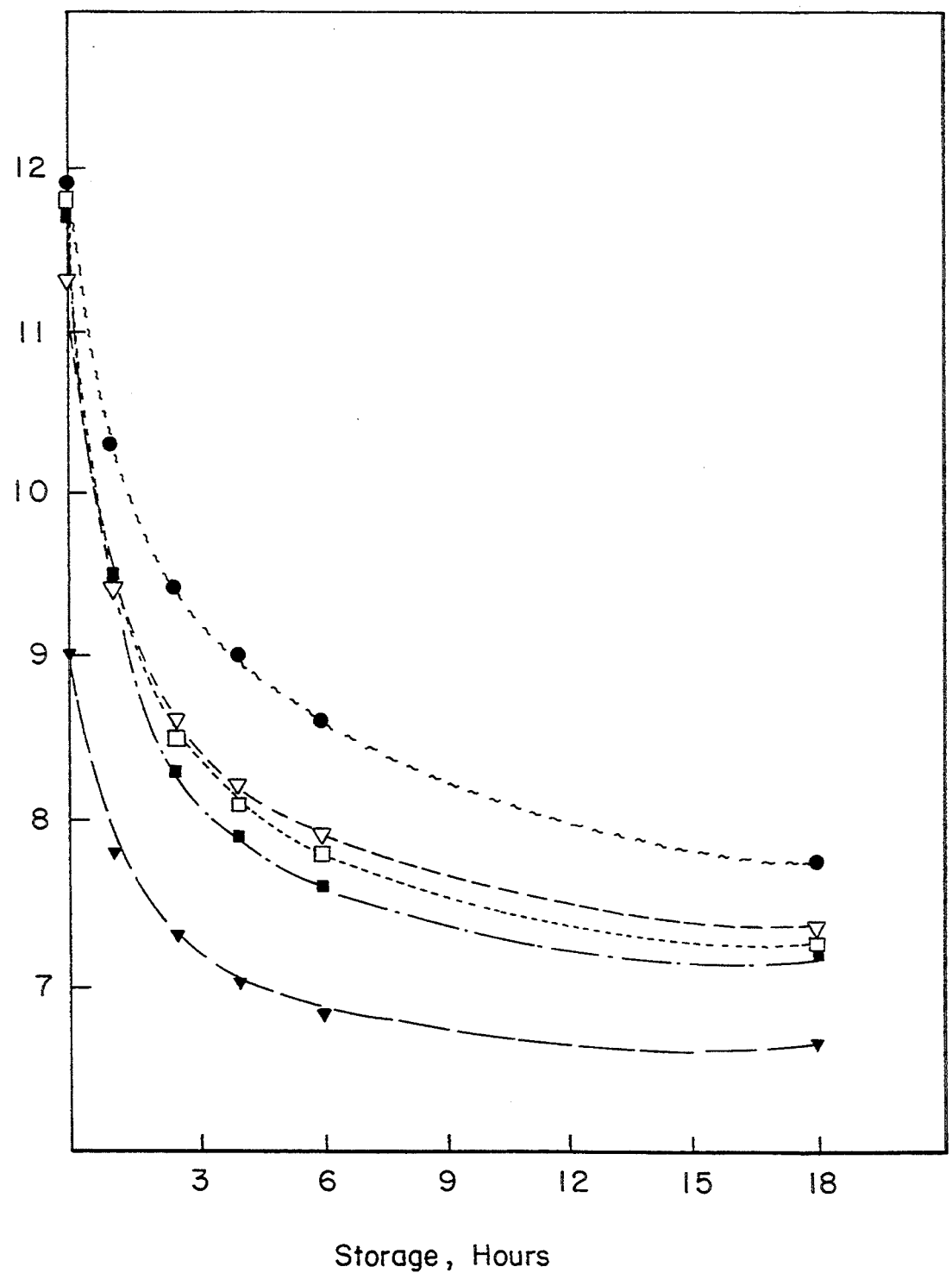
Figure 9:
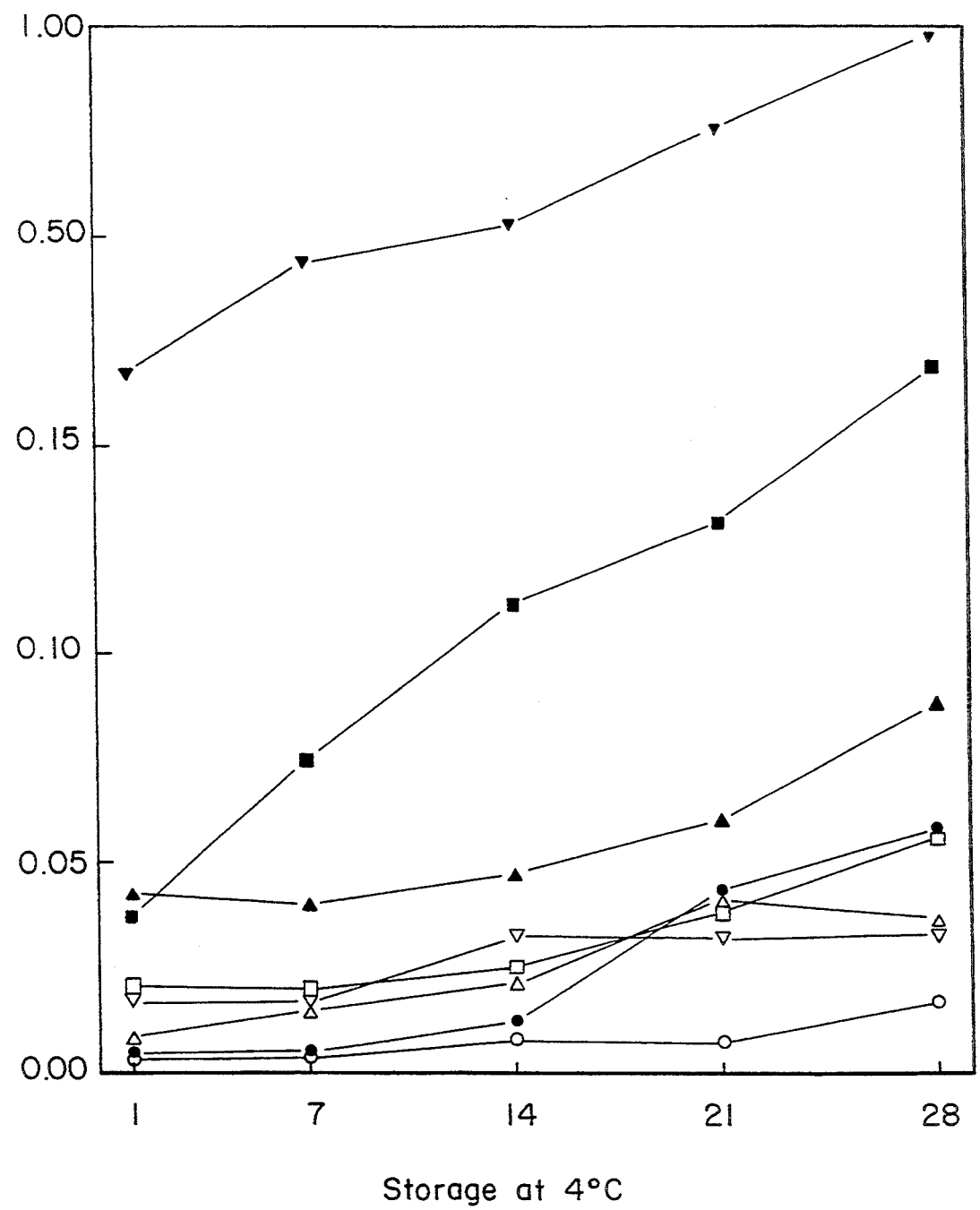

FIG. 7 is a graph of absorption spectra of various preformed pigments in which absorbance is shown as ordinate and in which wavelength (in nm) is shown as abscissa; Symbols: Absorption spectra of: powdered cooked-cured meat pigment (PCCMP) with N-LOK wall material, — - — - — - —; cooked cured-meat pigment (CCMP) from hemin/nitric oxide synthesis, ------; and pigments extracted from nitrite-cured ham, — — — — — —. All pigments were dissolved/extracted in acetone/water (4:1, V/V);

FIG. 8 is a graph of Hunter values, of nitrite-cured and pre-formed pigment-treated meats in which storage, in hours, is shown as abscissa; Symbols: ------; and powdered cooked cured-meat pigment (PPCMP) treated meats, stored under fluorescent lighting at 4° C. Wall materials of PCCMP were: N-LOK, ~~~~~~~; N-LOK (85%)+$\beta$-Cyclodextrim (15%), — — — —; N-LOK (80%)+$\beta$-Cyclodextrin (15%)+gum acacia (5%), — — - — -—; and modified $\beta$-cyclodextrin, — — — — —; and FIG. 9 is a graph of the effects of polyphosphates on various treated meat systems in which absorbance (at 532 nm) is shown as ordinate and in which storage, in hours, at 4° C., is shown as abscissa. Symbols (full) are: — , SHMP;  — , STPP;  — , SPP;  — , SAPP. Corresponding open symbols are for the same polyphosphates with sodium ascorbate.

4) DESCRIPTION OF PREFERRED EMBODIMENTS (i) Examples

The direct synthesis of CCMP from bovine red blood cells and its stability and color characteristics are described in the Examples below.

EXAMPLE I

Figure 1:
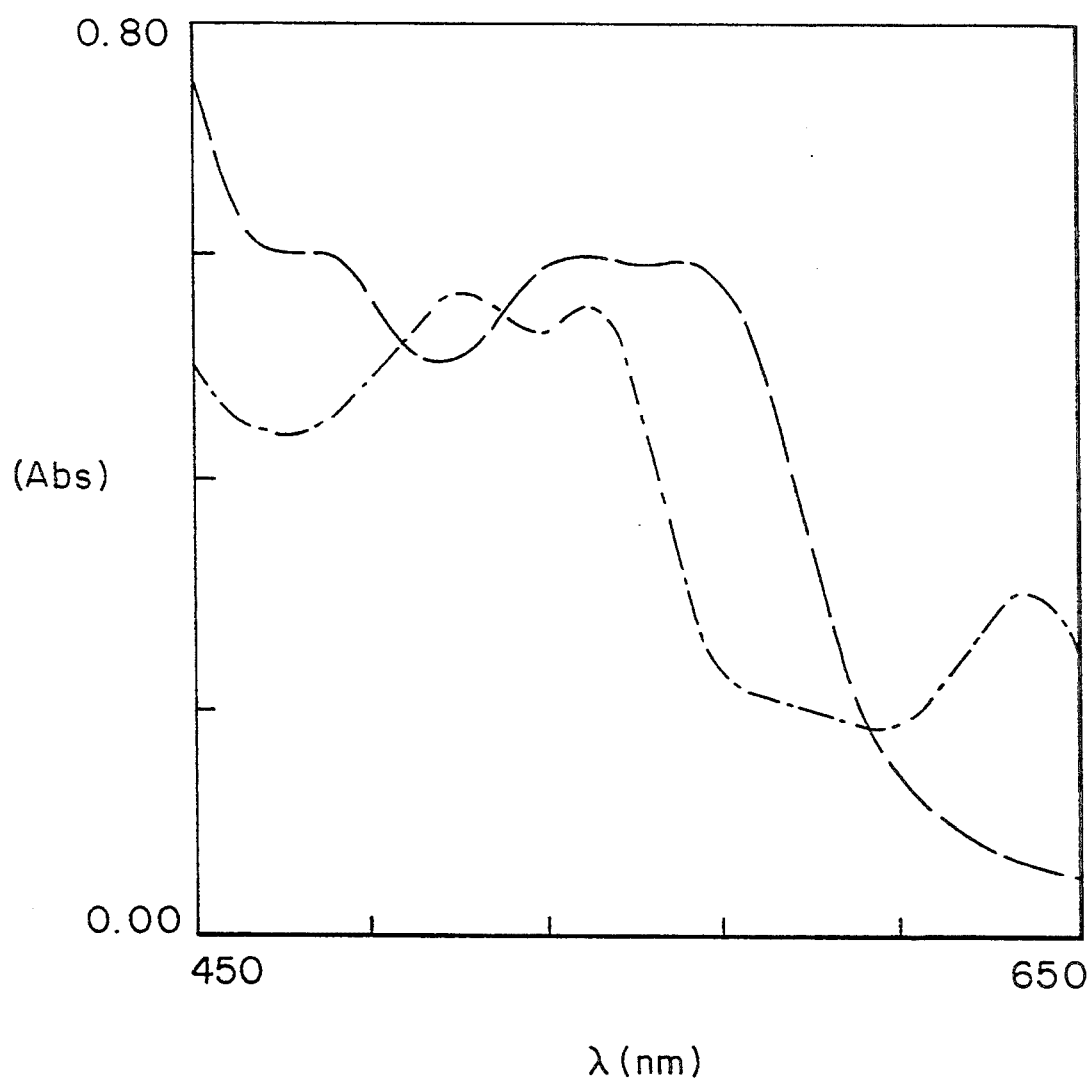

Bovine red blood cells (10 g) were added to 90 mL of 8:1 (v/v) distilled water/sodium hydroxide containing reductant(s) into which a nitrosating agent was introduced. Reducing agents (ascorbic acid, erythorbic acid, and/or ascorbyl palmitate) were added to the reaction mixture at a heme in RBC to reductant mole ratio of 1:5, 1:10, or 1:20. Sodium nitrite, the nitrosating agent employed, was added at a molar ratio of 1:10, heme to nitrite. The reaction mixture was heated at 85°±2° C. (lower temperatures of 75° and 80° C. were also tested) for 15 min with intermittent stirring, cooled in an ice bath to room temperature, and centrifuged for 2 min at 3000 rpm. The supernatant was acidified to pH 4 with 0.1M citric acid. Acidification may also be performed before cooling and centrifugation.. Use of acetic (0.1M), hydrochloric (0.1M), phosphoric (0.2M) or sulfuric (0.05M) acids as acidifying agents was also tested. During acidification, cooked cured-meat pigment as well as any remaining solubilized proteins were precipitated. After centrifugation for 2 min at 3000 rpm (905 ×g), supernatant containing any residual nitrite from the curing process was discarded. Yield and purity of pigment obtained from heat-treated RBC/nitrite solutions were determined after acidification of cooled reaction mixture to pH 4 and exhaustive extraction and recovery of the pigment from resulting precipitate using 4:1 (v/v) acetone:water solution. Analysis of variance and Tukey's studentized range tests were used to determine differences in mean yield and purity values based on data collected from three replications of each treatment. Significance was determined at a 95% level of probability. Absorption spectrum of CCMP in 4:1 (v/v) acetone:water solution was recorded in the visible range. A drop of concentrated hydrochloric acid was added to convert pigments to acid hematin for purity calculations; absorption spectrum of acid hematin was recorded as shown in FIG. 1.

Fresh post-rigor pork loins, not exhibiting PSE or DFD characteristics, were obtained from Newfoundland Farm Products Corporation, (St. John's, NF). The loins were trimmed of all subcutaneous fat and were ground twice using a meat grinder, known by the Trade-mark HOBART, (Hobart MFG Company Ltd., model 4146, Don Mills, ON) with a 0.79 cm and then a 0.48 cm plate. Several types of pork loin with different myoglobin contents were used in these experiments. Their myoglobin content was determined as described in the literature. Ground pork was mixed with 20% by weight of distilled water and 550 ppm sodium ascorbate (SA). Sodium nitrite and CCMP were added directly to meat samples at levels ranging from 0 to 156 ppm and 0 to 30 ppm, respectively. Mixtures were then thoroughly homogenized. Meat systems were cooked at 85°±2° C. in a thermostat-controlled water bath for ca. 45 min while stirring occasionally with a glass rod. After cooling to room temperature, cooked meat samples were homogenized in a blender, known by the Trade-mark WARING, for 30 sec and then transferred to petri dishes made of a borosilicate glass, known by the Trade-mark PYREX, for color evaluation. A colorimeter (Model XL-20 TRISTIMULUS$_{TM}$ Colorimeter, Gardner Laboratories Inc., Bethesda, Md.) was used to determine lightness (L value), red/green (+/− a value), and yellow/blue (+/− b value) of treated meats. A white ceramic tile having L=92.0, a=−1.1 and b=+0.7 was used to standardize the colorimeter. Hunter L, a, b color values were measured at 3 to 8 different locations on the muscle surface. Additionally, meat pigments from nitrite-cured and CCMP-treated samples, after cooking, were extracted into 4:1 (v/v) acetone:water solutions. Allowance was made for moisture content of meat. Absorption spectra in the visible range were recorded. For color stability experiments, samples were packed in polyethylene bags and were placed 25 cm below a set of two 30 W DAYLITE$_{TM}$ fluorescent lights at 4° C. Surface color measurements were carried out using the colorimeter, after different time intervals, as described above.

The effect of concentration and type of reducing agent on yield and purity of CCMP is presented below in Table 1.

TABLE 1

Effect of various reducing agents on yield and purity of preformed cooked cured-meat pigment (CCMP).

| Expt. No. | Treatment | [Reductant] [Heme] | Yield[1] (%) | Purity[1] (%) |
|---|---|---|---|---|
| 1 | Ascorbyl Palmitate | 5 | 51.9 ± 1.0$^c$ | 96.4 ± 1.6$^{bc}$ |
| 2 | (1) + Ascorbic Acid | 10 | 58.6 ± 8.7$^b$ | 97.8 ± 0.5$^{abc}$ |
| 3 | (1) + Erythorbic Acid | 10 | 44.8 ± 6.9$^c$ | 95.3 ± 1.0$^c$ |
| 4 | Ascorbic Acid | 10 | 94.0 ± 1.7$^a$ | 99.0 ± 0.6$^{ab}$ |
| 5 | Erythorbic Acid | 10 | 94.5 ± 2.0$^a$ | 99.0 ± 0.6$^{ab}$ |
| 6 | Ascorbyl Palmitate | 10 | 59.7 ± 2.4$^b$ | 97.1 ± 1.0$^{abc}$ |
| 7 | (4) + (6) | 20 | 94.9 ± 1.0$^a$ | 99.2 ± 1.0$^a$ |

[1]Means sharing any of same letters in a column are not significantly different (P > 0.05).

It is seen that CCMP was not produced when reductants were absent in the reaction. Reducing agents, maintained the iron atom of the iron-porphyrin complex (i.e. hemoglobin) in its ferrous state and hastened conversion of nitrite to nitric oxide. Available heme content in bovine red blood cells, calculated based on the iron content of RBC, was 1.18% (w/w).

EXAMPLE II

Incorporation of ascorbyl palmitate into the reaction at a reductant to heme mole ratio of 5:1, or greater, gave a low yield of CCMP. Ascorbic acid and erythorbic acid were significantly (P<0.05) more effective reducing agents when used at reductant to heme mole ratio of at least 10:1. Maximum yield of pigment was 95%. Addition of ascorbyl palmitate to systems, already containing either ascorbic acid or erythorbic acid, did not significantly (P<0.05) affect yield of the pigment. However, combination of ascorbyl palmitate with ascorbic acid or erythorbic acid in preparation of CCMP had a beneficial effect on color of treated meats after cooking. This could presumably be due to stabilization of pigment molecules by ascorbyl palmitate during preparation and storage, conceivably by a coating mechanism. At temperatures of less than 85° C., yield of pigment so obtained was considerably smaller than those reported in Table 1. No significant difference (P<0.05) in pigment's purity was evident by analysis of variance test when reducing agents were used individually at a reductant to heme mole ratio of 10:1 or in combination at a reductant to heme mole ratio of 20:1. A purity of greater than 98% was determined for CCMP in most cases.

In some preliminary experiments, use of STPP as a base in preparation of CCMP was tested. A maximum yield of only 10.2% was noticed. Thus, use of sodium hydroxide was examined. Effect of sodium hydroxide concentration on yield and purity of pigment is presented below in Table 2.

TABLE 2

Effect of sodium hydroxide concentration on yield and purity of pre-formed cooked cured-meat pigment (CCMP).[1]

| NaOH [M] | Yield[2] (%) | Purity[2] (%) |
|---|---|---|
| 0.0 | 66.1 ± 1.9[a] | 98.8 ± 1.0[a] |
| 0.1 | 83.5 ± 1.8[b] | 99.4 ± 0.6[a] |
| 0.2 | 94.9 ± 1.0[c] | 99.2 ± 1.0[a] |
| 0.3 | 88.6 ± 2.0[d] | 97.0 ± 2.0[a] |

[1]Reductants (ascorbic acid and ascorbyl palmitate) were present in the reaction at a 1:1 mole ratio and a reductant to heme ratio of 20.
[2]Means sharing any of same letters in a column are not significantly different (P > 0.05).

It is seen that the addition of sodium hydroxide had a significant effect (P<0.05) on the yield of the pigment but did not enhance its purity. Best yield of CCMP, nearly 95%, was obtained at a 0.2M sodium hydroxide concentration. The purity of the pigment was independent of base concentration as indicated by analysis of variance test.

EXAMPLE III

Use of inorganic acids, e.g. hydrochloric (0.1M), phosphoric (0.2M) and sulfuric (0.05M) acids or organic acids, e.g. acetic acid (0.1M) as acidifying agents for precipitation of CCMP gave purities which were similar to those obtained using citric acid, as seen below in Table 3, which shows the effects of various acidifying agents on the yield and purity of cooked cured-meat pigment.

TABLE 3

Effect of acidifying agents on yield and purity of cooked cured-meat pigment (CCMP).[1]

| Acid | Concentration (M) | Yield (%) | Purity (%) |
|---|---|---|---|
| Citric | 0.1 | 94.9 ± 1.0[a] | 99.2 ± 1.0[a] |
| Acetic | 0.1 | 65.1 ± 1.5[b] | 96.5 ± 1.2[a] |
| Hydrochloric | 0.1 | 87.5 ± 1.1[c] | 96.5 ± 1.0[a] |
| Phosphoric | 0.2 | 87.1 ± 1.0[c] | 98.5 ± 1.0[a] |
| Sulfuric | 0.05 | 91.4 ± 2.0[a] | 97.2 ± 1.2[a] |

[1]A reductant to heme ratio of 20 in 0.2M NaOH solution was used. Means sharing any of same letters in a column are not significantly different (P > 0.05)

However, yields so obtained were quite different. Thus, the use of mild food-grade organic acids, especially citric acid is suggested.

EXAMPLE IV

Figure 2:
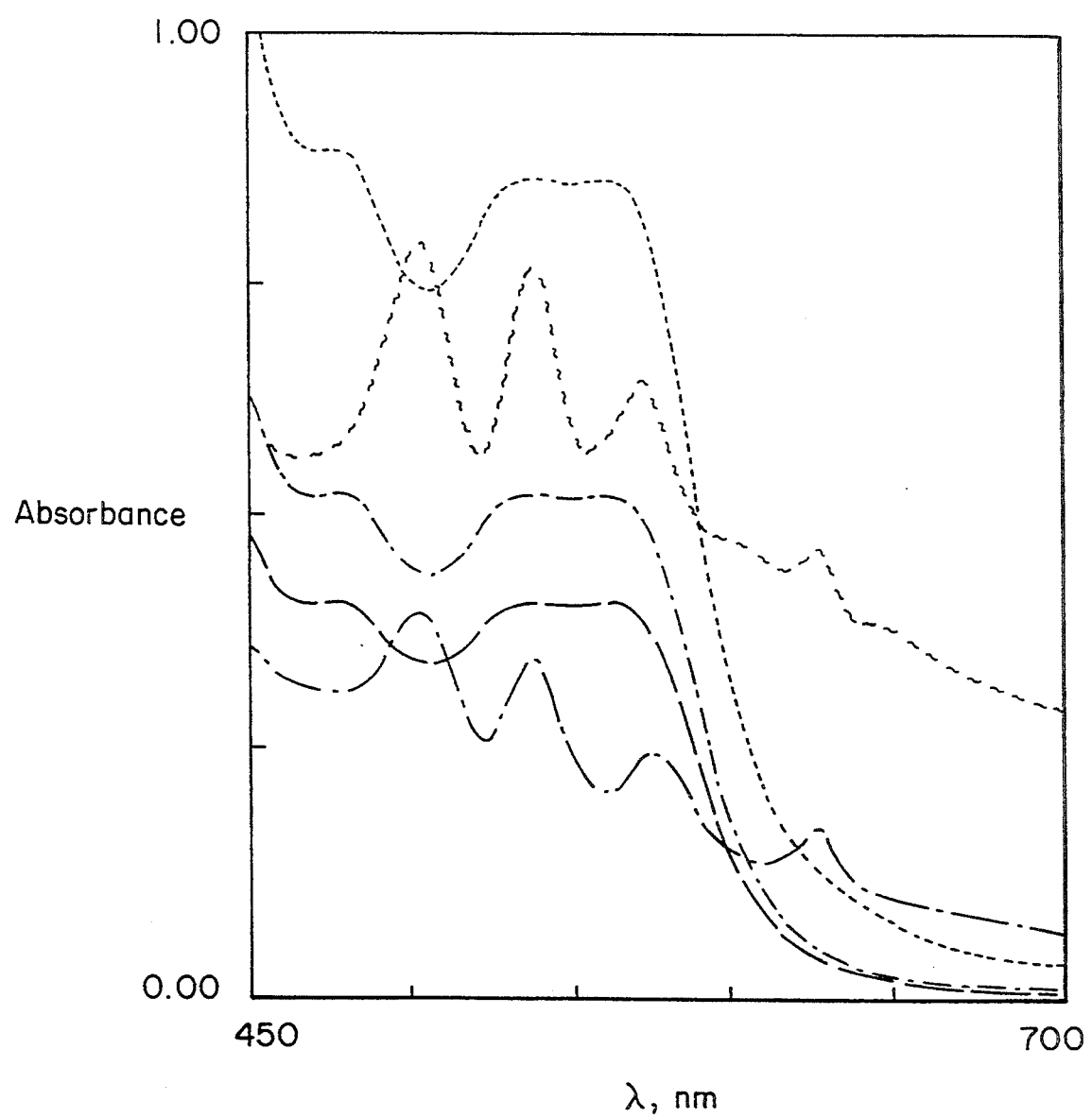

Absorption characteristics of CCMP prepared from RBC cells or hemin, before application to meat, were compared to those of extracted pigments from a nitrite-cured sample of ham (see FIG. 2). All pigments were dissolved/extracted in 4:1 (v/v) acetone:water mixtures. Similar maxima were observed in all cases. Furthermore, pigments extracted from meats treated with CCMP, after cooking, exhibited a spectrum, in the visible range, with identical absorption maxima compared to that from nitrite-cured meat.

The color characteristics of the pigment-treated meats, after cooking, as determined by their Hunter values, were examined and compared to their nitrite-cured and protoporphyrin-IX-treated counterparts. The addition of protoporphyrin-IX to meats did not reproduce the desired cured-meat color, as seen below in Table 4, which shows the Hunter L, a, and b value of nitrite-cured and pigment-treated cured meats.

EXAMPLE V

As expected, presence of iron in the protoporphyrin ring is essential for development of the typical cured color in meats. CCMP, being the natural colorant of cured meats, should be readily acceptable.

TABLE 4

Hunter L, a, b values of nitrite-cured and pigment-treated cooked meats.

| Additives | Hunter Values | | | |
|---|---|---|---|---|
| | L | a | b | Hue |
| Control (no additive) | 63.3 | 4.1 | 11.6 | 70.5 |
| Nitrite (150 ppm) | 62.4 | 11.6 | 9.5 | 39.3 |
| Preformed pigment (12 ppm) | 60.7 | 11.8 | 9.4 | 38.5 |
| Protoporphyrin-IX (60 ppm) | 52.1 | 6.8 | 9.4 | 54.1 |
| Protected pigment (1½ years) | 58.5 | 11.7 | 10.1 | 40.8 |

Results indicate that the addition of the preformed pigment to freshly prepared comminuted pork at 3 to 30 ppm level of addition produced, upon cooking, a pink color similar to that of nitrite-cured meats, as seen below in Table 5, which shows the dependence of Hunter color value of meat on concentration of cooked cured-meat pigment.

TABLE 5

Dependence of Hunter color values of meat on concentration of cooked cured-meat pigment (CCMP).

| Pigment ppm | Hunter Values | | |
|---|---|---|---|
| | L | a | b |
| Reference | 62.4 ± 0.2 | 11.6 ± 0.3 | 39.4 ± 0.5 |
| 3 | 62.0 ± 0.3 | 11.2 ± 0.2 | 40.1 ± 0.5 |
| 12 | 60.7 ± 0.5 | 11.8 ± 0.2 | 38.6 ± 0.5 |
| 18 | 59.1 ± 0.2 | 12.2 ± 0.2 | 37.3 ± 0.4 |
| 24 | 58.1 ± 0.3 | 12.5 ± 0.1 | 36.7 ± 0.5 |
| 30 | 57.5 ± 0.2 | 12.7 ± 0.2 | 36.2 ± 0.5 |

Figure 3:
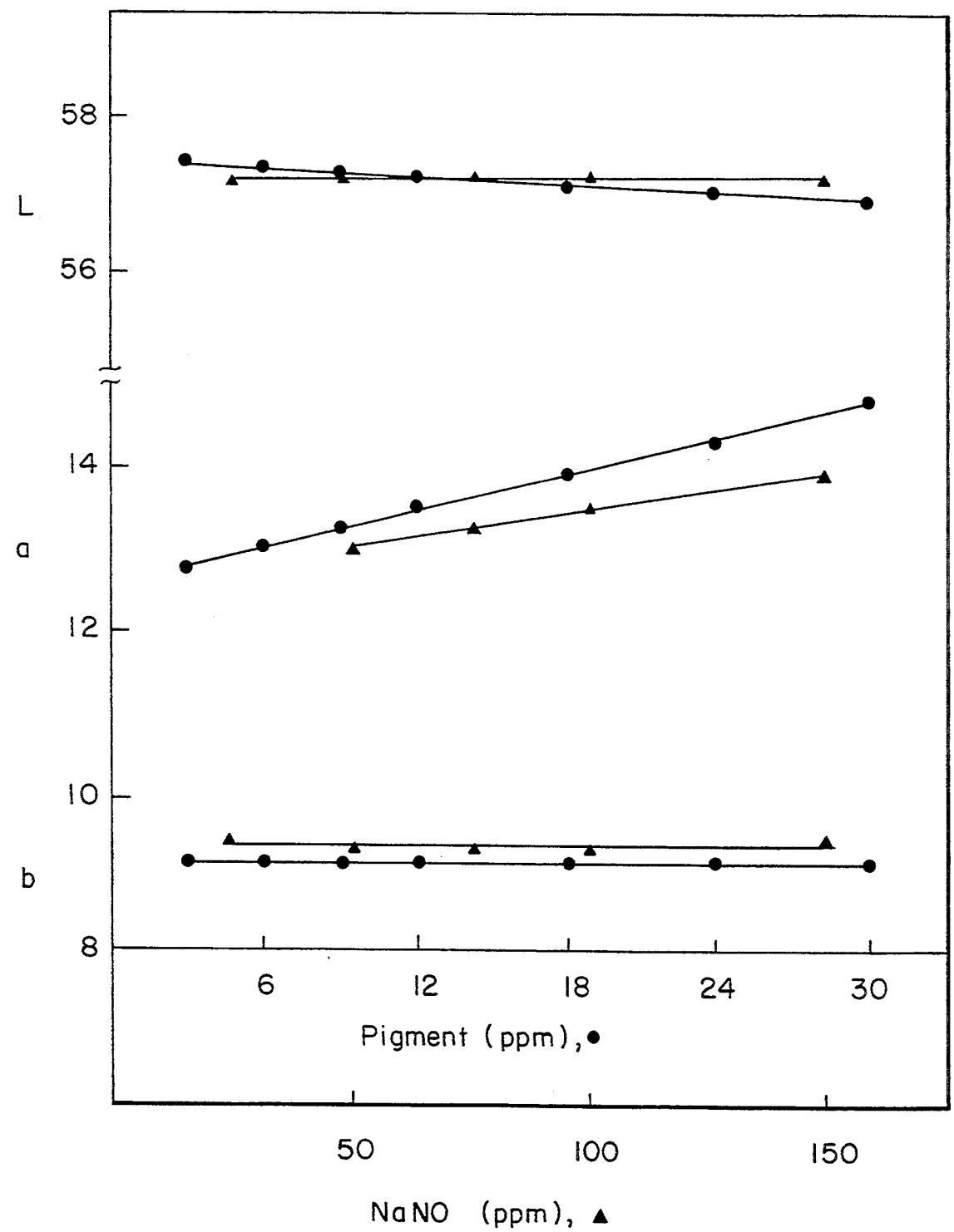
FIG. 3 is a graph of Hunter values of meats treated with pre-formed pigment in which Hunter values are shown as the ordinate and in which either pigment or $NaNO_2$ (in ppm) is shown as abscissa.

Although various levels of the preformed pigment were applied, the color imparted to meats at a 12–18 ppm level of addition was visually indistinguishable from that of nitride-cured pork (156 ppm). Hunter L, a, b values of CCMP- and nitrite-treated meats are shown in FIG. 3. A similar conclusion may be drawn when comparing the a values of nitride-cured and pigment-treated meats. As the concentration of added pigment to meat increased, an increase in Hunter a value was noticed. Subsequently, a more intense pinkish color in the products, presumably due to the presence of a large concentration of porphyrin materials was observed. As the CCMP addition level increased, pigment-treated samples conferred lower Hunter L values compared to their nitrite-cured counterparts thus indicating darker products. However, this is not to say that treated meats at higher CCMP addition level were visually less appealing.

EXAMPLE VI

Figure 4:
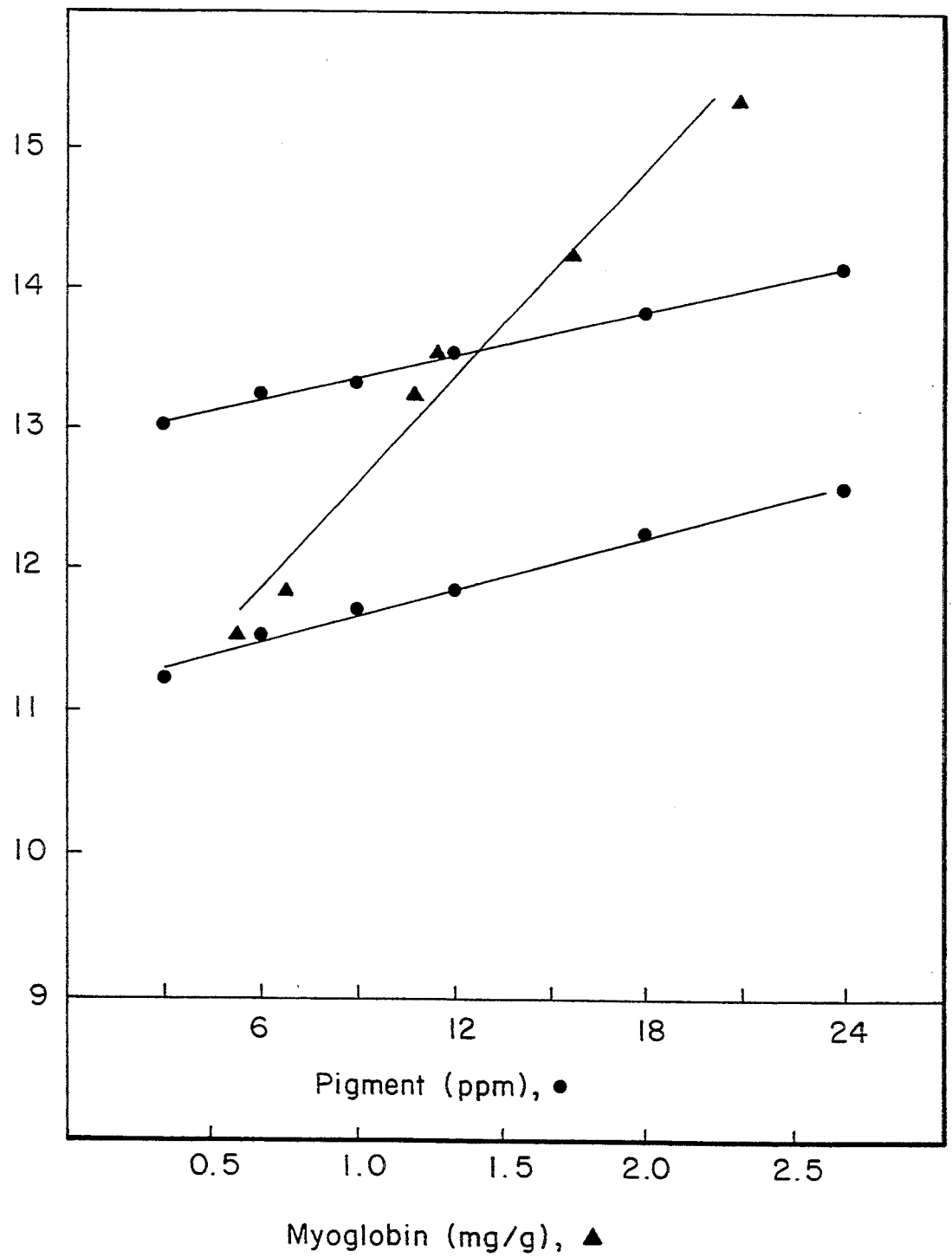
FIG. 4 is a graph of the dependence of Hunter values of cooked meats on myoglobin content in which Hunter values are shown as ordinate and in which pigment (in ppm) or myoglobin (in mg/g) is shown as abscissa.

Color intensity of pigment-treated meats depended largely on initial myoglobin content of samples studied. Of two types of pork examined, the pork sample containing 2.33 mg/g myoglobin showed Hunter a values which were about 2 units higher than that of pork containing 1.00 mg/g myoglobin. Addition of different levels of pre-formed pigment to meats resulted in an increase in Hunter a values which was concentration dependent. Moreover, final color depended on the myoglobin content of pork (see FIG. 4). Similar results were obtained when these meats were subjected to curing with 156 ppm of sodium nitrite. Furthermore, it was evident that in order to attain an attractive cured color in the final product, level of added pigment must be adjusted. Generally higher levels of pigment were required to impart an optimum color to meats with a high content of myoglobin. This is not surprising since the original myoglobin in the sample must be masked by nitrosated ferrohemochrome, and as such, more CCMP is required. Hunter Hue values of treated meats reflected a similar trend as they decreased with increasing level of myoglobin in meat or the addition level of nitrite or CCMP.

EXAMPLE VII

Several pilot-scale experiments for preparation of wieners were carried out. Results judged by subjective methods of analysis indicated that CCMP successfully imparted the characteristic cured color to treated products. The pigment was used as such or in encapsulated form, as described subsequently. Color intensity of wieners cured with different levels of nitrite or CCMP was dependent on myoglobin content of the original meat (as seen below in Table 6 which shows the dependence of Hunter color values of cooked meats and their myoglobin content) as well as concentration of these additives (as also seen above in Table 5).

TABLE 6

Dependence of Hunter color values of cooked meats on their myoglobin content.[1]

| Myoglobin | Nitrite-Cured | | | Pigment-Treated | | |
|---|---|---|---|---|---|---|
| mg/g | L | a | Hue | L | a | Hue |
| 0.75 ± 0.02 | 64.2 ± 0.3 | 10.8 ± 0.2 | 43.0 ± 0.6 | 63.3 ± 0.4 | 11.8 ± 0.2 | 39.4 ± 0.6 |
| 1.21 ± 0.03 | 57.9 ± 0.2 | 13.4 ± 0.2 | 34.6 ± 0.2 | 57.4 ± 0.2 | 13.2 ± 0.2 | 34.8 ± 0.4 |
| 2.33 ± 0.06 | 53.5 ± 0.8 | 15.4 ± 0.2 | 31.5 ± 0.6 | 52.1 ± 0.2 | 15.3 ± 0.2 | 31.4 ± 0.4 |

[1]Myoglobin content was determined according to established procedures in the literature.

EXAMPLE VIII

Figure 5:
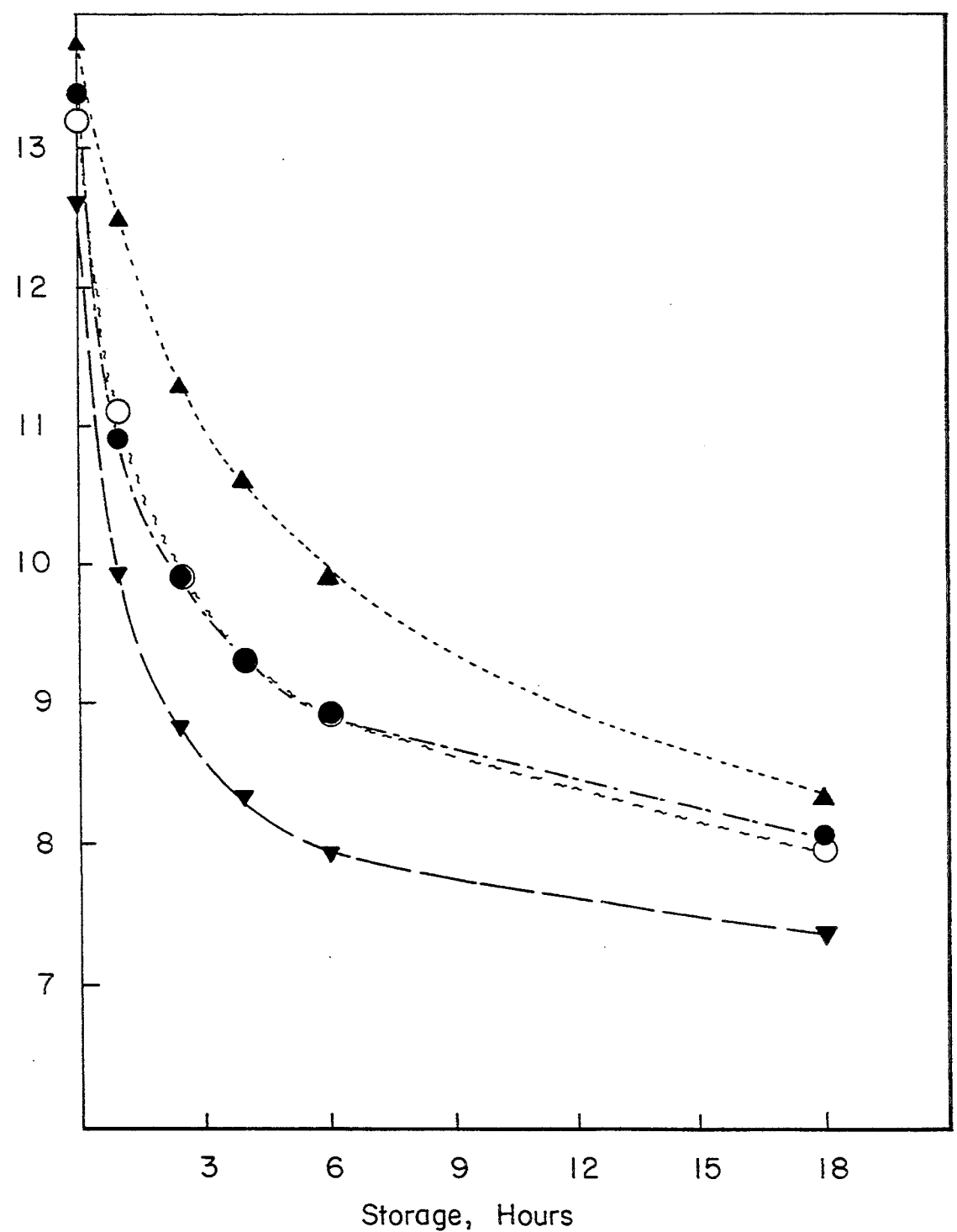
FIG. 5 is a graph of color stability of treated meats in which Hunter values are shown as ordinate and in which storage, in hours, is shown as the abscissa; Symbols: meat cooked with the pre-formed cooked cured-meat pigment at: 3 ppm,   ; 12 ppm, ◯; 30 ppm,   ; and with sodium nitrite at 156 ppm.
Figure 6A:
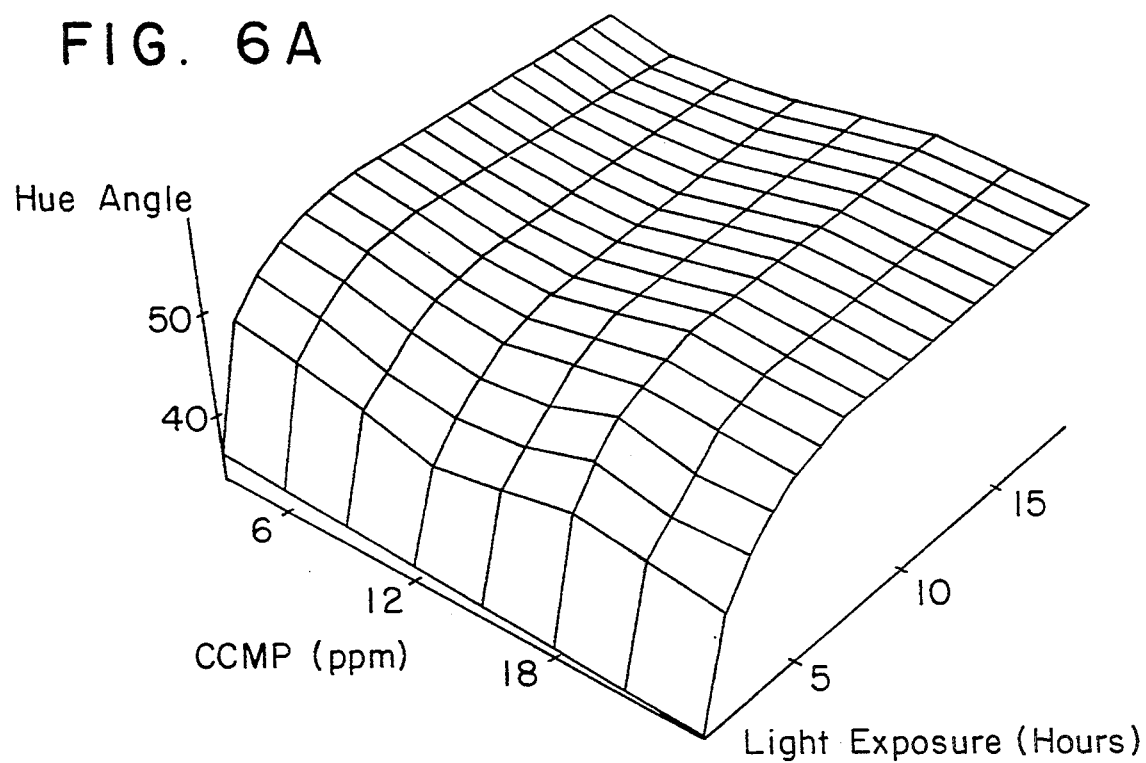
FIG. 6A and 6B are three-dimensional graphs of colour stability as affected by fluorescent light exposure of CCMP-treated (A) and nitrite-cured (B) meats as reflected in hue angle values.
Figure 6B:
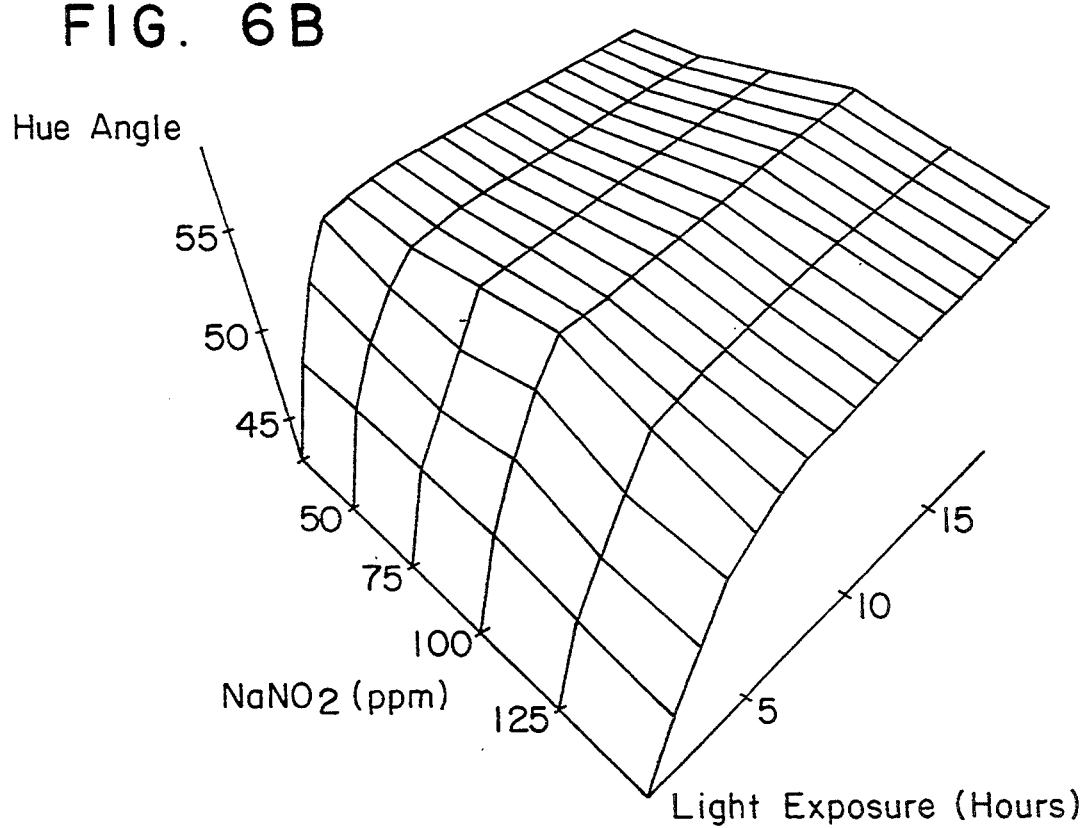

Color stability of meats treated with different addition levels of CCMP (3, 12 and 30 ppm) was also examined and compared with that of nitrite-cured meat at a 156 ppm addition level. Hunter a values of treated meats decreased rapidly during the first 6 h under intense fluorescent lighting (see FIG. 5). Furthermore, final Hunter a values generally depended on the total content of pigments which were present in meat systems. In all cases, a similar pattern was observed regardless of whether they were treated with CCMP or with sodium nitrite. However, meat treated with 12 ppm pigment most closely resembled that of nitrite-cured product in its fading characteristics. On the other hand, the hue angle of pigment-treated and nitride-cured meats increased rapidly during the first 6 h under the fluorescent lighting (FIG. 6). Again, final hue angles depended on the total content of heme pigments which were present in the systems. These results may indicate that color stability of nitrite-cured or pigment-treated meats, under conditions tested, does not depend on the presence of residual nitrite.

EXAMPLE IX

Further studies on application of preformed CCMP to meats were undertaken. The purpose was to compare the color of muscle foods cooked with CCMP, and sodium nitrite, using Hunter L, a, b color values. Muscle foods studied included cod surimi, pork, chicken breast, mechanically separated chicken meat (MSCM), beef, lamb, mechanically separated seal meat (MSSM) and seal surimi, as well as restructured and solid cut muscles of pork.

CCMP was prepared by methods described previously. Cod surimi was a product of Terra Nova Fisheries, Clarenville, NF and fresh pork loins were again supplied by Newfoundland Farm Products. Mechanically separated chicken or seal meats were deboned by a deboner known by the Trade-mark POSS DEBONER$_{TM}$ (Model DDE 500, Poss Limited, Toronto, ON). Other meat samples were bought from a local supermarket. Meats were comminuted using a HOBART$_{TM}$ meat grinder as described previously. Sodium nitrite or CCMP was added to comminuted meat samples at various levels as indicated in Table 7. The results show the effect of sodium nitrite and preformed cooked cured-meat pigment (CCMP) on Hunter L, a, b values, chromacity and hue angle of treated meats, poultry and cod surimi samples.

TABLE 7

Effect of sodium nitrite and preformed cooked cured-meat pigment (CCMP) on Hunter L, a, b values, chromacity and hue angle of treated meats, poultry and cod surimi samples.[1]

| Additive | Hunter Values | | | Chroma | Hue | ΔE |
|---|---|---|---|---|---|---|
| | L | a | b | | | |
| PORK | | | | | | |
| None | 58.3 ± 0.3$^a$ | 4.9 ± 0.1$^a$ | 12.1 ± 0.2$^a$ | 13.1 | 68.0 | 7.7 |
| NaNO$_2$ (156) | 58.6 ± 0.1$^a$ | 12.1 ± 0.1$^b$ | 9.3 ± 0.1$^b$ | 15.3 | 37.6 | Ref. |
| CCMP (8) | 57.9 ± 0.3$^b$ | 12.2 ± 0.2$^b$ | 9.0 ± 0.2$^b$ | 15.2 | 36.4 | 0.8 |
| CCMP (12) | 56.7 ± 0.2$^{bc}$ | 12.9 ± 0.2$^c$ | 8.9 ± 0.1$^b$ | 15.7 | 34.6 | 2.1 |
| CCMP (24) | 56.3 ± 0.1$^c$ | 13.5 ± 0.2$^d$ | 8.9 ± 0.2$^b$ | 16.2 | 33.4 | 2.7 |
| LAMB | | | | | | |
| None | 53.8 ± 0.3$^a$ | 5.3 ± 0.2$^a$ | 11.8 ± 0.1$^a$ | 12.9 | 65.8 | 10.5 |
| NaNO$_2$ (156) | 53.6 ± 0.2$^a$ | 15.3 ± 0.4$^{bc}$ | 8.6 ± 0.1$^b$ | 17.6 | 29.3 | Ref. |
| CCMP (12) | 52.7 ± 0.3$^b$ | 14.5 ± 0.2$^b$ | 8.5 ± 0.2$^b$ | 16.8 | 30.4 | 1.2 |
| CCMP (24) | 52.2 ± 0.4$^{bc}$ | 14.9 ± 0.3$^{bc}$ | 8.3 ± 0.1$^b$ | 17.1 | 29.1 | 1.5 |
| CCMP (30) | 52.0 ± 0.3$^{bc}$ | 15.3 ± 0.4$^{bc}$ | 8.3 ± 0.1$^b$ | 17.4 | 28.5 | 1.6 |
| CCMP (36) | 51.6 ± 0.3$^c$ | 15.5 ± 0.2$^c$ | 8.3 ± 0.2$^b$ | 17.6 | 28.2 | 2.0 |
| BEEF | | | | | | |
| None | 49.2 ± 0.5$^a$ | 5.7 ± 0.2$^a$ | 11.2 ± 0.3$^a$ | 12.6 | 63.0 | 12.7 |
| NaNO$_2$ (156) | 48.0 ± 0.5$^b$ | 18.1 ± 0.2$^b$ | 8.7 ± 0.1$^b$ | 20.1 | 25.7 | Ref. |

TABLE 7-continued

Effect of sodium nitrite and preformed cooked cured-meat pigment (CCMP) on Hunter L, a, b values, chromacity and hue angle of treated meats, poultry and cod surimi samples.[1]

| Additive | Hunter Values | | | Chroma | Hue | ΔE |
| --- | --- | --- | --- | --- | --- | --- |
| | L | a | b | | | |
| CCMP (12) | 47.7 ± 0.3$^{bc}$ | 13.5 ± 0.2$^c$ | 8.8 ± 0.2$^b$ | 16.1 | 33.1 | 4.6 |
| CCMP (24) | 46.8 ± 0.4$^{cd}$ | 15.8 ± 0.1$^d$ | 8.6 ± 0.1$^b$ | 18.0 | 28.6 | 2.6 |
| CCMP (36) | 45.9 ± 0.3$^d$ | 18.0 ± 0.3$^b$ | 8.6 ± 0.2$^b$ | 20.0 | 25.5 | 2.1 |
| SEAL MEAT | | | | | | |
| None | 24.2 ± 0.2$^{ab}$ | 7.8 ± 0.1$^a$ | 8.0 ± 0.1$^a$ | 11.2 | 45.7 | 14.0 |
| NaNO$_2$ (156) | 24.1 ± 0.1$^b$ | 15.4 ± 0.2$^b$ | 7.5 ± 0.2$^b$ | 17.1 | 26.0 | 6.4 |
| NaNO$_2$ (500) | 24.1 ± 0.2$^b$ | 21.8 ± 0.5$^c$ | 7.8 ± 0.2$^{ab}$ | 23.2 | 14.7 | Ref. |
| CCMP (12) | 24.0 ± 0.1$^b$ | 12.5 ± 0.1$^d$ | 7.5 ± 0.2$^b$ | 14.6 | 31.0 | 9.3 |
| CCMP (24) | 23.8 ± 0.1$^b$ | 14.2 ± 0.1$^c$ | 7.4 ± 0.1$^b$ | 16.0 | 30.6 | 7.6 |
| CCMP (36) | 24.9 ± 0.5$^a$ | 19.8 ± 0.2$^f$ | 8.0 ± 0.1$^a$ | 21.4 | 22.0 | 2.2 |
| CCMP (48) | 23.8 ± 0.3$^b$ | 22.3 ± 0.3$^c$ | 8.0 ± 0.2$^a$ | 23.7 | 19.7 | 0.6 |
| SEAL SURIMI | | | | | | |
| None | 28.9 ± 0.2$^a$ | 6.3 ± 0.1$^a$ | 8.1 ± 0.1$^a$ | 10.3 | 52.1 | 8.1 |
| NaNO$_2$ (156) | 26.8 ± 0.2$^a$ | 14.4 ± 0.2$^b$ | 7.3 ± 0.1$^c$ | 16.2 | 26.9 | Ref. |
| CCMP (12) | 29.3 ± 0.3$^a$ | 14.6 ± 0.3$^b$ | 7.7 ± 0.1$^b$ | 16.5 | 27.8 | 0.7 |
| CCMP (24) | 29.0 ± 0.2$^a$ | 14.8 ± 0.2$^b$ | 7.5 ± 0.1$^{bc}$ | 16.6 | 26.9 | 0.5 |
| CCMP (36) | 30.0 ± 0.2$^b$ | 15.6 ± 0.3$^c$ | 8.0 ± 0.1$^a$ | 17.5 | 27.1 | 1.8 |
| CHICKEN BREAST MEAT | | | | | | |
| None | 75.8 ± 0.2$^a$ | 1.9 ± 0.1$^a$ | 12.7 ± 0.1$^a$ | 12.8 | 81.5 | 3.9 |
| NaNO$_2$ (156) | 74.6 ± 0.3$^b$ | 5.0 ± 0.1$^b$ | 10.6 ± 0.1$^b$ | 11.7 | 64.8 | Ref. |
| CCMP (6) | 73.9 ± 0.4$^c$ | 5.3 ± 0.2$^b$ | 9.7 ± 0.2$^c$ | 11.1 | 61.3 | 1.0 |
| CCMP (12) | 72.0 ± 0.5$^d$ | 6.4 ± 0.1$^c$ | 9.6 ± 0.3$^c$ | 11.5 | 56.3 | 3.1 |
| CCMP (24) | 69.1 ± 0.1$^c$ | 7.4 ± 0.1$^d$ | 9.6 ± 0.2$^c$ | 12.1 | 52.4 | 6.1 |
| MECHANICALLY DEBONED CHICKEN MEAT | | | | | | |
| Control | 51.2 ± 0.1$^a$ | 4.6 ± 0.1$^a$ | 13.8 ± 0.1$^a$ | 14.6 | 71.6 | 7.7 |
| NaNO$_2$ (156) | 52.9 ± 0.1$^b$ | 11.4 ± 0.2$^{bc}$ | 10.7 ± 0.2$^b$ | 15.6 | 43.2 | Ref. |
| CCMP (6) | 52.6 ± 0.1$^b$ | 11.1 ± 0.2$^b$ | 10.8 ± 0.1$^b$ | 15.5 | 44.2 | 0.4 |
| CCMP (12) | 51.5 ± 0.3$^a$ | 11.3 ± 0.1$^{bc}$ | 10.7 ± 0.2$^b$ | 15.6 | 43.4 | 1.4 |
| CCMP (24) | 51.1 ± 0.2$^a$ | 11.8 ± 0.3$^c$ | 10.6 ± 0.2$^b$ | 15.9 | 41.9 | 1.8 |
| COD SURIMI | | | | | | |
| None | 70.9 ± 0.4$^a$ | .2.0 ± 0.2$^a$ | 7.5 ± 0.1$^a$ | 7.8 | 89.0 | 0.3 |
| NaNO$_2$ (156) | 71.2 ± 0.2$^a$ | .2.1 ± 0.1$^a$ | 7.5 ± 0.2$^a$ | 7.8 | 88.9 | Ref. |
| CCMP (12) | 63.6 ± 0.2$^b$ | 2.7 ± 0.2$^b$ | 9.2 ± 0.3$^b$ | 9.6 | 73.6 | 9.2 |
| CCMP (24) | 57.1 ± 0.1$^c$ | 5.7 ± 0.2$^c$ | 9.2 ± 0.1$^b$ | 10.8 | 58.2 | 16.2 |
| | [58.3 ± 0.3]$^d$ | [4.9 ± 0.1]$^d$ | [12.1 ± 0.2]$^c$ | [13.1] | [68.0] | [15.4] |
| CCMP (36) | 55.4 ± 0.4$^e$ | 8.0 ± 0.2$^e$ | 8.8 ± 0.2$^b$ | 11.9 | 47.7 | 18.8 |
| CCMP (60) | 48.3 ± 0.3$^f$ | 8.8 ± 0.1$^f$ | 9.2 ± 0.2$^b$ | 12.7 | 46.3 | 25.4 |

[1]Values in parantheses indicate ppm concentration of adjuncts used. Values in each column for each species with same symbols are not different (P > 0.05). Hunter values in brackets are for uncured pork.

EXAMPLE X

Hunter L, a, b color values of comminuted muscle foods cooked with nitrite or CCMP were determined with the Gardner colorimeter as described previously. Results are shown above in Table 7. For uncured muscles, generally n values decreased as muscles became darker in color. Thus, chicken breast had the largest and seal meat had the smallest Hunter L values. Similarly, Hunter a values increased as the myoglobin content of processed meat increased. Furthermore, a similar trend was observed for Hunter a values of nitrite-cured and pigment-treated muscles. The amount of pigment required to obtain a similar color to that of nitrite-cured reference in each case depended on the type of meat used. Thus, darker meats generally required a larger amount of pigment in order to mimic the color of nitrite-cured reference sample.

Effect of washing of seal meat on color characteristics of its muscle was pronounced in that its Hunter n value was somewhat increased and its Hunter a value decreased. Thus, seal surimi more closely resembled pork or beef.

EXAMPLE XI

Table 8 below summarizes Hunter L, a, b values of a restructured sample of ham and solid cut muscles of pork which were pickled in either nitrite- or pigment-containing solutions. Pickle solutions employed contained STPP, SA, sodium chloride, CCMP or sodium nitrite at various concentrations. The methodology used for pickling solid cuts of pork with a CCMP is described below.

In a 10 L container, 100 g of STPP was dissolved in 5 L of 4° C. distilled water. Nitrogen was bubbled through the solution for 10 min to remove any dissolved oxygen. CCMP was synthesized, as described previously, and then added to this solution at various levels based on the particular example being carried out. In a separate container, 0.5 kg of NaCl and 20 g of SA were dissolved in 5 L of 4° C. water. These 2 solutions were combined, mixed well, and then boneless pork loins were added. Nitrogen was purged through the system for 10 min and the container was covered with PARAFILM$_{TM}$ and aluminum foil to protect the systems against exposure to air and light, respectively. Meats were marinated for selected times up to a total of 7 days and at temperatures ranging between 4° and 15° C. in a variable-temperature controlled refrigerator.

After storage, marinated loins were removed from their pickle, strained, and transferred to polyethylene vacuum package bags (Eastern Paper Company, St. John's, NF). These meats were cooked in an 85° C. thermostated-water bath for 60 min or until an internal temperature of 70° C. or greater was reached. After cooking, meats were removed from their package, weighed, and drip loss recorded. Loins were then sliced horizontally such that a visual examination of the extent of diffusion of CCMP through the muscle could be done. Measurements on the extent of diffusion were recorded as well as Hunter L, a, b values of the interior and exterior surfaces of the loins.

Generally, the pink color of these pigment-treated muscles was uniform. Most of the CCMP was picked up by the sample during the first 48 h. Final color, however, depended on concentration of the pigment, temperature of the pickling solution, and length of storage. Full penetration of the pigment to the meat was achieved after a sufficient period of time. However, meats used in this study weighed only 0.5 kg, whereas for larger cuts, a combination of stitch pumping or multiple injections and pickling of the CCMP solution may be required for complete dispersion of CCMP in the muscle tissue. However, with injection of the CCMP solution into meats, deposition of CCMP may pose a problem.

In addition to the freshly prepared CCMP, a spray-dried encapsulated CCMP, herein referred to as the powdered cooked cured-meat pigment (PCCMP), was used in these pickling studies. Preparation of PCCMP and its application to comminuted meats is described below. Pickle solutions containing PCCMP conferred the typical pink color to solid cuts of meat as those of their CCMP-treated counterparts. However, the concentration of PCCMP, based on the original quantity of CCMP in PCCMP, used in pickle solutions was approximately 3 times greater than that of CCMP. Perhaps during spray-drying, some of the CCMP may be thermally degraded, or it may not be fully protected by the carbohydrate matrix against oxidation processes. Thus, larger concentrations of PCCMP would then be required to confer the same color effect as that imparted by CCMP.

Both comminuted and solid cut muscles or restructured meats may be treated with nitrite-free combinations containing CCMP or PCCMP. However, optimization of various parameters involved in the pickling process of pigment-treated meats, such as use of either CCMP or PCCMP, their respective addition levels, concentration and type of adjuncts, temperature of the pickle, mode of pickling, length of storage, and possibly a tumbling period, is still required.

(NDPA), as internal standard, was distilled under vacuum at 45°–50° C. in an all-glass flash evaporator. For samples that foamed excessively during vacuum distillation, the Ba(OH)$_2$ solution was replaced with 190 mL of 1% (w/v) sulfamic acid and 10 mL of 1N H$_2$SO$_4$. The aqueous distillate was made alkaline and then extracted with dichloromethane. The dichloromethane extract was washed successively with an acidic buffer (to remove amines) and dilute alkali. The organic layer was dried by passing it through a layer of anhydrous sodium sulfate, and the dried extract was concentrated to 1.0 mL by using macro and micro KUDERNA-DANISH$_{TM}$ concentrators. The concentration of volatile N-nitrosamines in the final extract was determined by analyzing 6–8 $\mu$L of the extract using a gas-liquid chromatography-thermal-energy analyzer (GLC-TEA) methodology. This procedure allowed for detection as well as quantitation of N-nitrosodimethylamine (NDMA).

For GLC-TEA analyses of extracts, a VARIAN$_{TM}$ gas-liquid chromatograph (Model 2700) coupled to a TEA$_{TM}$ detector (Thermo Electron Corporation, Waltham, Mass., Model 502) was used. The GLC conditions were as follows: column, 6 ft × ⅛ in (o.d.) Ni tubing packed with 20% CARBOWAX$_{TM}$ 20M and 2% NaOH on 80–100 mesh acid-washed CHROMOSORB$_{TM}$ P; carrier gas, Ar; 30 mL/min; GLC oven temperature, 170° C.; injector port temperature, 220° C.; TEA furnace temperature, 450° C.; TEA vacuum chamber pressure, 1 mm Hg; TEA cold trap, stainless steel trap, immersed ⅓ in liquid nitrogen; and recorder, 1 mV span. To ensure absence of contamination due to the presence of N-nitrosamines in reagents, a blank was run. Furthermore, each bottle of dichloromethane was tested for N-nitrosamine contamination before use.

Confirmation for the presence of N-nitrosamines was carried out using a gas-liquid chromatograph-mass spectrometry (GLC-MS) technique. Prior to GLC-MS confirmation, the extract obtained from the above step was mixed with 10 mL of anhydrous N-nitrosamine-free n-pentane and the mixture was passed through a short column (1 cm × 4 cm) of basic alumina containing 3% water. The column was washed with 25 mL of anhydrous n-pentane and washings were discarded. The column was then eluted with 50 mL of dichloromethane and the eluate carefully concentrated to 0.5 mL using a

TABLE 8

Hunter color values of nitrite- and cooked cured-meat pigment (CCMP)-treated restructured and intact muscles of pork[1].

| Additive | Meat Type | Hunter Values | | | |
|---|---|---|---|---|---|
| | | L | a | b | Hue |
| NaNO$_2$ (I) | Solid cut muscle | 52.5 ± 1.5 | 9.8 ± 0.5 | 5.6 ± 0.3 | 34.0 ± 1.4 |
| NaNO$_2$ (II) | " | 50.4 ± 2.2 | 11.7 ± 0.8 | 6.1 ± 0.1 | 27.4 ± 1.2 |
| CCMP (I) | " | 51.6 ± 0.8 | 9.6 ± 0.7 | 6.5 ± 0.4 | 34.2 ± 2.1 |
| CCMP (II) | " | 44.3 ± 0.5 | 13.9 ± 0.4 | 8.5 ± 0.2 | 31.3 ± 0.7 |
| CCMP (III) | Restructured | 44.0 ± 0.6 | 13.1 ± 0.4 | 7.2 ± 0.1 | 28.9 ± 0.6 |

[1]Muscles weighed about 1 lb. on average. Symbols I, II and III refer to different meat lots used. Concentration of NaNO$_2$ and CCMP in end products was 156 ppm and 12 ppm, respectively. Values are means of eight replications of triplicate determinations.

EXAMPLE XII

The presence of N-nitrosamines was tested for both nitrite-free CCMP-treated as well as for their uncured and nitrite-cured counterparts. A 20–25 g aliquot of homogenized sample was analyzed by a low-temperature vacuum distillation method. A suspension of the sample in 200 mL of a 5% (w/v)Ba(OH)$_2$ solution together with 100 ng of N-nitroso-di-n-propylamine KUDERNA-DANISH$_{TM}$ concentrator (macro and micro SNYDER$_{TM}$ column). A 2–5 $\mu$L aliquot of the extract was used for analyses. For the GLC-MS analyses, a VARIAN MAT$_{TM}$ (Model 311A) mass spectrometer (MS) equipped with an electron-impact ionization source and coupled to a VARIAN AEROGRAPH$_{TM}$ gas chromatograph (Model 1400) was used. The GLC column was similar to that used for GLC-TEA analysis.

The MS was operated in the selective ion monitoring mode for the molecular ion of NDMA at a resolution of 5000–7000. Operating conditions were: source temperature, 250° C.; emission current, 2 mA; electron voltage, 71 eV; and accelerating voltage, 3 kV. The GLC was operated under isothermal (115° C.) conditions.

Composite nitrite-free meat curing systems containing CCMP or PCCMP have been successful in duplicating the color, flavor and bacteriostasis of their nitrite-cured counterparts. To justify the use of such composite systems, absence of carcinogenic N-nitrosamines in finished products should be verified. Since nitrite or any of its derivatives are not added, the occurrence of N-nitrosamines is not anticipated in cooked products. However, CCMP is a nitrosylated heme derivative of myoglobin/hemoglobin with the potential to act itself as a nitrosating agent. Since CCMP is known to decompose in the presence of light and oxygen, transnitrosation reactions involving other meat constituents are possible. Although the likelihood of occurrence of such reactions is remote, nonetheless, the presence of volatile N-nitrosamines in nitrite-free cured pork, cod, cod surimi or hybrid meat/fish systems containing CCMP was investigated. Uncured and nitrite-cured samples were used as controls.

Although presence of all volatile N-nitrosamines was tested, only NDMA was detected in some of the nitrite-cured products. Table 9 summarizes the content of volatile NDMA in cooked, uncured, nitrite-cured (156 mg/kg) and CCMP-treated (12 mg/kg) pork, cod, cod surimi and pork/fish hybrid systems.

Only 0.9, 0.3 and 1 µg/kg of NDMA, as confirmed by MS, was detected in the nitrite-cured cod, pork/cod (15%) and pork/clod (50%) hybrid formulations, respectively. These results may reflect the very fresh nature and careful processing of the fish used. The precursor of NDMA, dimethylamine (DMA), is formed in the muscles of fish due to the action of endogenous enzymes on trimethylamine N-oxide. Although NDMA was present in nitride-cured fish-containing products, this and other volatile N-nitrosamines were absent in uncured and nitrite-free, CCMP-treated samples. This implies that either no disproportion of CCMP had occurred or that insufficient amounts of nitric oxide were produced to participate in transnitrosation reactions. Absence of N-nitrosamines in nitrite-cured cod surimi suggests that washing of cod muscles may be an effective means of removing or reducing the concentration of DMA or its precursors from fish muscles. No volatile N-nitrosamines were detected in uncured and CCMP-treated cod surimi samples. However, NDMA was detected at a concentration of 0.2 µg/kg in nitrite-cured pork-cod hybrid formulations at both 15 and 50% substitution of cod. Furthermore, CCMP-treated hybrid analogs were free of any detectable NDMA as observed for cod-containing samples.

Consequently, composite nitrite-free curing systems containing a colorant (CCMP or PCCMP), an antioxidant/chelator system (e.g., butylated hydroxyanisole+sodium tripolyphosphate+sodium ascorbate) and an antimicrobial agent (e.g., sodium hypophosphite) can be employed successfully to prepare processed meat products with identical characteristics of their nitride-cured analogs without the fear of N-nitrosamine formation. Additionally, it has been demonstrated that nitrite-free curing of fish and fishery by-products in combination with red meats in the production of novel products is now possible.

TABLE 9

Presence of N-Nitrosodimethylamine (NDMA) in Uncured, Nitrite-Cured and CCMP-Treated Cooked Meat Systems[1].

| Processing Treatment | NDMA (µg/kg) IN MEAT SYSTEMS[2] | | | | | | |
|---|---|---|---|---|---|---|---|
| | Pork | Cod | Cod Surimi | Pork + Cod[3] | | Pork + Cod Surimi | |
| | | | | 15% | 50% | 15% | 50% |
| Uncured | ND | ND | ND | ND | ND | ND | ND |
| Nitrite-Cured | ND | 0.9 | ND | 0.3 | 1.0 | 0.2 | 0.2 |
| CCMP-Treated | ND | ND | ND | ND | ND | ND | ND |

[1] All systems in addition to the meat and/or fish listed above contain 20% (w/w) distilled water, 3000 mg/kg sodium tripolyphosphate, 2500 mg/kg sodium hypophosphite, 550 mg/kg sodium ascorbate and 30 mg/kg butylated hydroxyanisole.
[2] The 15 and 50% represents the percentage of cod or cod surimi substituted for pork in hybrid formulations. ND = not detected.
[3] Detection limit of the thermal-energy analyzer for N-nitrosamines is 0.2 µg/kg.

EXAMPLE XIII

Since CCMP offers attractive properties, there is a need to develop an industrially viable production process, suitable for commercial application. In addition, it is necessary to stabilize this pigment in order to improve its handling under commercial production conditions. Subsequently, stabilization of the pigment was carried out via encapsulation techniques in order to improve its handling under commercial production conditions. The encapsulation process has already been used for preservation of some natural oils by different companies. For the purpose of the present invention, starch and modified starch, cyclodextrins, dextrans, amylose, and gelatin proved useful as encapsulating agents. Cyclodextrins have a cavity in the centre of their molecules and the pigment as such, or a part of it, may form an inclusion compound with these carbohydrates, or simply by a coating mechanism, thus protecting it from oxidation, and perhaps light. The quality of protected pigment was then compared with that of freeze-dried samples. Finally, encapsulated pigment was applied to meat systems. The product, in combination with other agents, as indicated below, will present industry and government with a suitable alternative curing system to nitrite. The above process seems commercially feasible and attractive.

There are two key steps in making powdered cooked-cured meat pigment, PCCMP. The first step is preparation of CCMP from bovine red blood cells. It should either be prepared directly from it or through a hemin intermediate, as described previously. The second key step is stabilization of CCMP. The starting point of this process is preparation of a solution or paste of starch, modified starches, e.g., N-LOK$_{TM}$, maltodextrins, Schardinger dextrins, their polymers or their derivatives or combinations, optionally together with glycerin or gums, such as gum acacia. Furthermore, a reductant is added to prevent oxidative degradation of the pigment during and after the locking process. The pigment dissolved in a basic solution containing a food-grade reductant is added to solution or paste of carbohydrate-based polymers to protect and physically entrap the pigment molecules; glycerin or gums, if added, serve as a binding agent. Finally, the mixture is freeze-dried, spray-dried, or drum-dried to obtain powdered cooked cured-meat pigment (PCCMP).

The pigment remains locked in powder until it is released by adding water to it. Upon dissolution in water or in pickle solutions, it acts as a potent agent for color development in nitrite-free curing mixtures. Its application in a wide variety of meat emulsion systems of poultry, pork, lamb, beef, cod, cod surimi, seal and seal surimi, as well as hybrid products has been extensively studied. Best performance of the pigment is observed for meat systems containing a low or intermediate concentration of myoglobin/hemoglobin. In cod surimi, an uncured rather than a cured color was imparted to Kamaboco-type products. Its application to restructured and solid cuts of meat has also been achieved. A summary of the protocol is provided below.

Two novel approaches for enhancing the storage stability of CCMP were investigated as well as the studies on color characteristics of pigment-treated meat products. β-cyclodextrin, also known as Schardinger dextrin or RINGDEX B$_{TM}$ was provided by Toyomenka America Inc., (New York, N.Y.). N-LOK$_{TM}$ was acquired from National Starch and Chemical Corporation (Bridgewater, N.J.), while modified β-cyclodextrin lot RR3-HE Series was obtained from American Maize-Products Company (Hammond, Ind.). All MALTRIN$_{TM}$ samples were supplied by the Grain Processing Corporation (Muscatine, Iowa). Sodium tripolyphosphate (STPP) and sodium acid pyrophosphate (SAPP) were obtained from Albright and Wilson Americas (Toronto, ON). Ascorbic acid (AA) and ascorbyl palmitate (AP) were supplied by Hoffman-La Roche Limited (Toronto, ON). Gum acacia was purchased from Aldrich Chemical Company, Inc. (Milwaukee, Wis.).

CCMP was prepared from hemin and nitric oxide or directly from bovine red blood cells as described previously. A typical medium scale preparation of CCMP from hemin is outlined below.

EXAMPLE XIV—PREPARATION OF PCCMP

Bovine hemin (600 mg) was dissolved in 100 mL of 0.04M Na$_2$CO$_3$ solution. While in dark and under a nitrogen atmosphere, 10.0 g sodium dithionite or SA with or without 10.0 g STPP were added to the mixture. At this stage either 500 mL more Na$_2$CO$_3$ solution or 900 mL of a 0.2M acetate buffer (pH=6.5) was added. Nitric oxide was then slowly bubbled into the mixture for 5 min. The container was then capped and stored in dark until use. Cooked cured-meat pigment was recovered as a precipitate from the mixture after its centrifugation and repeated washing with a 2% (w/v) ascorbic acid solution to ensure elimination of any traces of nitrite from the mixture.

A spray drier known by the Trade-mark BUCHI MINI SPRAY DRYER$_{TM}$ (Model 190), Büchi Laboratory-Techniques Limited, Flawil, Switzerland was used for preparation of PCCMP. Nitrogen was used as the spray flow gas in order to minimize contact between CCMP and oxygen. Optimized spray drying conditions were: inlet ≧150° C.; outlet 98° C.; feed flow 5.5 mL·min$^{-1}$ and nitrogen pressure 375 kPa(g). An emulsion of pigment and encapsulating agent(s) was formulated prior to spray drying. Encapsulating agents or wall materials investigated were N-LOK, β-cyclodextrin, modified β-cyclodextrin, gum acacia and MALTRIN M-250. Wall materials, used individually or in combination, were generally employed at a 1.5% (w/w) final level (i.e., ratio of pigment to wall material(s)). STPP, SAPP, and AP were used in combination together with some of the above encapsulating agents. The optimum level was selected based on examination of Hunter L, a, b value of a typical set of PCCMP-treated samples.

EXAMPLE XV—PREPARATION OF EMULSION

To prepare the emulsion, wall material(s) was/were first dissolved or dispersed in water. Addition of a few drops of sodium hydroxide helped to increase solubility of β-cyclodextrin and some other wall materials. The preformed CCMP was then introduced into this mixture together with AA at a CCMP/AA ratio 1:2 (w/w). The emulsion was diluted with water generally to 3.5% (w/w) and in some cases up to 10.0% (w/w) solids (i.e., ratio of solids present to water used). Higher solids, at conditions employed, did not allow dissolution of CCMP in the mixture. This solution was thoroughly stirred to ensure uniform dispersion of pigment. The vessel containing the emulsion was covered with PARAFILM$_{TM}$ and aluminium foil to minimize exposure of CCMP to oxygen and light. The emulsion was then spray dried at operating conditions stated earlier, unless otherwise specified.

EXAMPLE XVI—PREPARATION OF STABILIZED CCMP

In the second method, pigment precipitates (100–1000 mg) were washed with 3×20 mL of a 2% (w/v) AA solution and were then transferred into an amber-colored ampule. After centrifugation, supernatant was discarded and precipitates were covered with a 20–50 mL super-saturated nitric oxide solution containing 2% (w/w) AA. The ampule was then frozen in liquid nitrogen and sealed with a flame. Sealed pigment tubes were opened after 3, 6 and 9 months of storage. Quality of pigment was checked by monitoring its absorbance at 540 and 563 nm. Absorption intensities at these wavelengths and relative changes were noted. Pigment stored for 9 months was also applied to meat to check coloring potency and quality.

EXAMPLE XVII—PREPARATION OF MEAT/PCCMP COMPOSITION

Comminuted pork was mixed with 20% (w/w) water and 550 ppm SA. CCMP preserved in a nitric oxide solution in sealed amber-colored ampules or PCCMP from different formulations was added to meat samples at levels of 12 or 40, 50 and 60 ppm. Systems were mixed thoroughly to obtain homogenized samples. Meats were then cooked either in a glass container or in casings in moulded metal containers (15 cm×1.8 cm, i.d.) at 85°±2° C. in a thermostat-controlled water bath of about 40 min to reach an internal temperature 75°±2° C., while stirring occasionally with a glass rod. After cooling to room temperature, cooked meat samples were homogenized in a blender, known by the Trade-mark WARING, for 30 sec and then stored in 4.5 mm thick KAPAK$_{TM}$/SCOTCHPAK$_{TM}$ heat sealable pouches.

EXAMPLE XVIII—PREPARATION OF MEAT/PCCMP COMPOSITION

In another set of experiments, precipitated CCMP was separated after decanting the supernatant. This pigment was then applied to comminuted meat at 12 ppm addition. Color of cooked treated-meat was evaluated by its Hunter L, a, b parameters. In another set, three tubes containing precipitated CCMP were mixed with 2 mL of a 2% (w/v) AA solution. The mixture was vortexed for 20 sec. Tubes were then centrifuged and the supernatant was decanted. One pigment tube was retained for subsequent addition to meat. The washing procedure was repeated. Pigments obtained after a second and a third wash were also applied to ground meat and color was evaluated on the resultant samples. Finally, a pigment sample which was washed twice with the AA solution was added at 12 ppm to a meat formulation. Furthermore, a nitride-cured control was used. As before, color characteristics of these treated-meat samples after cooking were examined.

CCMP from hemin-nitric oxide synthesis or produced directly from bovine red blood cells, as well as stored pigment in a nitric oxide solution or in powdered form (PCCMP) was dissolved/extracted in 4:1 (v/v) acetone/water solutions. Absorption spectra of these samples were recorded using either a Shimadzu UV-260 or a Beckman DU-8 spectrophotometer. Acetone/water extracts of PCCMP were filtered through filter paper known by the trade-mark WHATMAN NO. 3 before spectral analysis to avoid problems of turbidity arising from interference of insoluble wall materials. Meat pigments from nitrite-cured and pigment-treated comminuted pork, after cooking, were extracted in 4:1 (v/v) acetone/water. All absorption spectra in the visible range were recorded. Furthermore, the Gardner colorimeter was used to determine Hunter L, a, b values of treated meat systems as described previously.

COMPARISON TEST NO. 1

Comminuted meat samples treated with 156 ppm sodium nitrite, 12 ppm freshly prepared CCMP, 12 ppm pigment stored for 9 months under nitric oxide, and 50 ppm of PCCMP encapsulated in selected wall materials were subjected to intense fluorescent lighting. Packaged meat samples were placed 25 cm under a set of two 30-Watt fluorescent lamps known by the Trade-mark DAYLITE in a 4° C. walk-in refrigerator. Samples were withdrawn after different storage times for color evaluation.

Although a large number of experiments was performed and many different wall material combinations or encapsulating agents were tested, only some representative results are shown here. In all cases reported, color quality of meats treated with PCCMP was compared with those treated with 12 ppm of freshly prepared CCMP and 156 ppm of sodium nitrite. Previously, it has been shown that color characteristics of meats treated with 12 ppm CCMP were indistinguishable from that of nitrite-cured counterparts. Although examination of color by sensory means might be preferred, it was found that it did not offer any further information in our study. Thus, color parameters of treated meats which closely resembled those of nitrite-cured counterparts (±1 Hunter a value) were considered desirable. Although smaller differences observed by instrumental means were statistically significant ($P < 0.05$), these were not easily noticeable as judged by experimenters who were most familiar with these systems. Furthermore, such samples were generally found to be indistinguishable from those of nitrite-cured counterparts. Treated samples which did not satisfy this condition were always found to be undesirable and visually different from those cured with nitrite.

All pigment solutions showed characteristic absorption pattern of iron-porphyrin compounds with a red color and had maxima at 540 and 563 nm. Furthermore, pigments extracted from cooked PCCMP-treated meats exhibited identical absorption pattern and maxima to those reported above (see FIG. 7). Thus, it might be reasonable to assume that microencapsulation and spray drying did not alter the chemical nature of CCMP. However, this was not verified. The most important variables in preparation of PCCMP were type of wall materials used as well as final level and inlet temperature of the spray dryer. Solid content in the mixture to be spray dried was about 3.5–5% and this was found to afford best results. Other parameters such as feed flow rate and nitrogen pressure were of less importance.

Hunter L, a, b values of a typical set of PCCMP-treated meat samples were monitored in order to set the optimum final level (i.e., weight ratio of CCMP to wall material(s)), of the pigment in encapsulating materials. The effect of level in Hunter L, a, b values of meats cooked with PCCMP is shown below in Table 10.

TABLE 10

Effect of level on Hunter L, a, b values of meats cooked with powdered cooked cured-meat pigment (PCCMP)[1].

| Experiment Number | Treatment | Wall Materials | Payload % | Hunter Values[2] | | |
|---|---|---|---|---|---|---|
| | | | | L | a | b |
| 1 | No additive | — | — | $59.0 \pm 0.2^a$ | $4.7 \pm 0.2^d$ | $11.4 \pm 0.1^a$ |
| 2 | NaNO$_2$, 156 ppm | — | — | $58.4 \pm 0.1^b$ | $11.8 \pm 0.2^{bc}$ | $9.1 \pm 0.1^b$ |
| 3 | CCMP, 12 ppm | — | — | $57.9 \pm 0.2^b$ | $11.7 \pm 0.2^{bc}$ | $9.1 \pm 0.1^b$ |
| 4 | PCCMP, 50 ppm | 95% N-LOK[3] | 0.67 | $52.0 \pm 0.2^d$ | $11.8 \pm 0.2^{bc}$ | $9.1 \pm 0.1^b$ |
| 5 | (4) | (4) | 1.0 | $52.1 \pm 0.2^d$ | $11.9 \pm 0.2^b$ | $9.1 \pm 0.1^b$ |
| 6 | (4) | (4) | 1.5 | $52.5 \pm 0.1^d$ | $12.9 \pm 0.1^a$ | $8.9 \pm 0.1^c$ |
| 7 | (4) | (4) | 2.0 | $53.8 \pm 0.2^c$ | $11.3 \pm 0.2^c$ | $8.7 \pm 0.2^c$ |
| 8 | (4) | (4) | 3.0 | $53.6 \pm 0.2^c$ | $11.3 \pm 0.1^c$ | $8.7 \pm 0.2^c$ |

[1]Percentage of solids in the mixture was 10%.
[2]Wall materials contained 2% sodium tripolyphosphate, 2% sodium acid pyrophosphate and 1% ascorbyl palmitate.
[3]Mean values of 3 to 6 replicates ± standard deviations are given. Values bearing some superscripts are not significantly ($P > 0.05$) different from one another.

As seen in Table 10 the best encapsulated pigments had a final level of 1 to 1.5%. Furthermore, as the final level was increased from 1 to 1.5%, a significant ($P < 0.05$) increase in the Hunter a value of meats treated with PCCMP was noted. However, at higher levels, less wall material was available to protect CCMP. In those, effective color imparted by spray-dried pigment was significantly ($P < 0.05$) reduced. This was shown by a decrease in Hunter a values. In all experiments related to pink color intensity of products, a higher Hunter a value was preferred since it potentially allowed less PCCMP addition to meats to achieve a given final color. No significant ($P < 0.05$) differences were noted in L and b values as the payload was varied.

COMPARISON TEST NO. 2

Of several variables in the spray-drying condition of CCMP, inlet temperature was found to be of critical importance. Typical results (shown below in Table 11)

indicated that an inlet ≧150° C. afforded best quality PCCMP as judged by Hunter color measurements of PCCMP-treated meats.

TABLE 11

Effect of inlet temperature of spray dryer on Hunter L, a, b values of meats cooked with powdered cooked cured-meat pigment[1] (PCCMP).

| Inlet Temperature °C. | Hunter Values[2] | | |
|---|---|---|---|
| | L | a | b |
| 130 | 52.7 ± 0.2[a] | 11.8 ± 0.1[b] | 9.1 ± 0.2[a] |
| 150 | 52.5 ± 0.1[a] | 12.9 ± 0.1[a] | 8.9 ± 0.2[a] |
| 150[3] | 52.8 ± 0.2[a] | 12.6 ± 0.2[a] | 9.2 ± 0.2[a] |
| 170 | 52.4 ± 0.1[a] | 12.6 ± 0.2[a] | 9.2 ± 0.2[a] |

[1]Wall materials were 95% N-LOK, 2% sodium tripolyphosphate, 2% sodium acid pyrophosphate and 1% ascorbyl palmitate. PCCMP was added at 50 ppm, unless otherwise specified.
[2]Mean values of 3 replicates ± standard deviation.
[3]PCCMP was added at a 35 ppm level. Values bearing same superscripts are not significantly (P > 0.05) different from one another.

As the inlet temperature was increased from 130° to 150° C., a significant (P<0.05) increase in Hunter a values of PCCMP-treated meat was noticeable. Variations of the inlet temperature did not affect Hunter L or b values of treated meats. Since spray performance depended on the inlet temperature, at a given flow and aspiration rate, a temperature of 150°–170° C. could be used. Thus, an inlet temperature of 150° C. was selected for other experiments.

COMPARISON TEST NO. 3

The effect of concentration of PCCMP on color intensity of treated meats was also monitored. Table 12 (below) summarizes typical results for PCCMP-treated meats in which combinations of wall materials consisted of 95% N-LOK, 2% STPP, 2% SAPP and 1% AP.

TABLE 12

Effect of pigment concentration on Hunter L, a, b values of cooked meats.[1]

| Treatment | Hunter Values[2] | | |
|---|---|---|---|
| | L | a | b |
| No additive | 59.0 ± 0.2[a] | 4.7 ± 0.1[d] | 11.4 ± 0.1[a] |
| NaNO₂, 156 ppm | 58.4 ± 0.1[b] | 11.8 ± 0.2[c] | 9.1 ± 0.1[b] |
| CCMP, 12 ppm | 57.9 ± 0.2[c] | 11.7 ± 0.2[c] | 9.1 ± 0.1[b] |
| PCCMP, 30 ppm | 54.5 ± 0.2[d] | 12.2 ± 0.2[bc] | 9.1 ± 0.1[b] |
| PCCMP, 50 ppm | 52.5 ± 0.1[e] | 12.9 ± 0.1[a] | 8.8 ± 0.1[c] |

[1]A payload of 1.5% (w/w) was used. Wall materials for PCCMP were N-LOK, 95%; sodium tripolyphosphate, 2%; sodium acid pyrophosphate, 2%; and ascorbyl palmitate, 1%. All samples included 20% (w/w) water and 550 ppm sodium ascorbate. CCMP, cooked cured-meat pigment; PCCMP, powdered cooked cured-meat pigment.
[2]Mean values of 6 replicates ± standard deviations. Values bearing same superscripts are not significantly (P > 0.05) different from one another.

Results indicated that PCCMP-treated samples at 30–40 ppm levels mostly resembled the color of nitrite-cured meats. Higher addition levels of PCCMP significantly (P<0.05) increased Hunter a values and decreased Hunter L values of treated samples. However, the effect may not be visually unattractive. Nonetheless, optimal addition level of spray-dried pigment to meat depends primarily on its original myoglobin content as well as conditions under which encapsulation was performed.

COMPARISON TEST NO. 4

Based on forementioned experiments and under optimum conditions specified above, color characteristics of PCCMP-treated meats were examined as a function of different wall material(s). Typical results of this comparison are provided below in Table 13.

TABLE 13

Hunter L, a, b values of PCCMP-treated meats as affected by wall material(s).[1]

| Experiment Number | Additives | Wall Material(s) | Hunter Values[2] | | |
|---|---|---|---|---|---|
| | | | L | a | b |
| 1 | No additive | — | 59.0 ± 0.2[a] | 4.7 ± 0.1[k] | 11.4 ± 0.1[a] |
| 2 | NaNO₂, 156 ppm | — | 58.4 ± 0.1[ab] | 11.8 ± 0.2[cf] | 9.1 ± 0.1[d] |
| 3 | CCMP, 12 ppm | — | 57.9 ± 0.2[b] | 11.7 ± 0.2[cfg] | 9.1 ± 0.1[d] |
| 4 | PCCMP, 50 ppm | N-LOK | 54.0 ± 0.2[ghi] | 11.9 ± 0.2[dc] | 9.2 ± 0.1[cd] |
| 5 | (4) | β-cyclodextrin | 54.7 ± 0.1[cdef] | 11.7 ± 0.1[efg] | 9.1 ± 0.1[d] |
| 6 | (4) | Modified β-cyclodextrin | 54.0 ± 0.2[ghi] | 9.0 ± 0.1[d] | 9.6 ± 0.1[bc] |
| 7 | (4) | Maltrin M-250 | 53.3 ± 0.2[jkl] | 11.6 ± 0.1[efg] | 9.7 ± 0.2[b] |
| 8 | (4) | Gum Acacia | 53.4 ± 0.2[ijkl] | 11.1 ± 0.2[h] | 9.2 ± 0.2[cd] |
| 9 | (4) | 95% (4) + 5% (8) | 53.2 ± 0.2[kl] | 12.4 ± 0.2[bc] | 9.1 ± 0.1[d] |
| 10 | (4) | 95% (4) + 5% (COMBO) | 52.8 ± 0.2[f] | 12.9 ± 0.1[a] | 9.1 ± 0.1[d] |
| 11 | (4) | 90% (4) + 5% (8) + 5% (COMBO) | 54.8 ± 0.2[cde] | 11.1 ± 0.1[h] | 9.3 ± 0.2[bcd] |
| 12 | (4) | 85% (4) + 15% (5) | 53.9 ± 0.2[ghij] | 11.3 ± 0.1[gh] | 9.2 ± 0.1[cd] |
| 13 | (4) | 80% (4) + 15% (5) + 5% (8) | 54.0 ± 0.2[ghi] | 11.7 ± 0.1[efg] | 9.2 ± 0.1[cd] |
| 14 | (4) | 80% (4) + 15% (6) + 5% (8) | 53.6 ± 0.1[hijk] | 11.4 ± 0.1[fgh] | 9.2 ± 0.1[cd] |
| 15 | (4) | 80% (4) + 15% (5) + 5% (COMBO) | 53.2 ± 0.2[kl] | 12.6 ± 0.1[ab] | 9.0 ± 0.2[d] |
| 16 | (4) | 75% (4) + 15% (5) + 5% (8) + 5% (COMBO) | 53.3 ± 0.2[jkl] | 12.0 ± 0.1[cde] | 8.9 ± 0.1[d] |
| 17 | (4) | 70% (4) + 30% (5) | 53.2 ± 0.2[kl] | 11.9 ± 0.2[de] | 9.1 ± 0.1[d] |
| 18 | (4) | 98% (5) + 1% (STPP) + 1% (SAPP) | 55.1 ± 0.2[c] | 10.5 ± 0.1[f] | 9.3 ± 0.2[bcd] |
| 19 | (4) | 95% (5) + 5% (COMBO) | 53.4 ± 0.2[ijkl] | 11.4 ± 0.2[fgh] | 9.1 ± 0.1[d] |
| 20 | (4) | 95% (5) + 5% (8) | 53.3 ± 0.1[jkl] | 12.3 ± 0.1[bcd] | 9.3 ± 0.1[bcd] |
| 21 | (4) | 90% (5) + 5% (8) + 5% (COMBO) | 54.9 ± 0.2[cd] | 11.1 ± 0.2[h] | 9.6 ± 0.1[bc] |
| 22 | (4) | 95% (6) + 5% (COMBO) | 54.0 ± 0.1[ghi] | 9.1 ± 0.1[j] | 9.2 ± 0.2[cd] |
| 23 | (4) | 95% (7) + 5% (COMBO) | 54.4 ± 0.2[defg] | 12.3 ± 0.1[bcd] | 9.2 ± 0.2[cd] |
| 24 | (4) | 80% (7) + 15% (5) + 5% (COMBO) | 54.1 ± 0.1[fgh] | 11.9 ± 0.1[de] | 9.2 ± 0.1[cd] |
| 25 | (4) | 80% (7) + 15% (6) + 5% (COMBO) | 54.2 ± 0.5[efgh] | 11.0 ± 0.1[h] | 9.3 ± 0.1[bcd] |

[1]All samples were cooked with 20% (w/w) water and contained 550 ppm sodium ascorbate. COMBO refers to a combination of STPP/SAPP/AP (2:2:1, w/w/w). An average yield of 59–68% (maximum 76%) of encapsulated product was obtained in all cases. Samples were kept at a refrigerated temperature of 2–4° C.
[2]Mean values of 3 replicates ± standard deviation. Values bearing same superscripts are not significantly (P > 0.05) different from one another.

Generally carbohydrates are used in microencapsulation processes because of their low cost and good functionality. Simple starch hydrolysates, modified starches or various gums are most commonly used. In the present specification, of wall materials examined individually, N-LOK$_{TM}$, β-cyclodextrin and MALTRIN$_{TM}$ M-250 most closely resembled color characteristics of nitrite-cured meat which were also indistinguishable from that of meat treated with 12 ppm of freshly prepared CCMP. In addition to MALTRIN M-250, other grades of MALTRIN namely M-040, M-100, M-200, M-500 and M-700 were tested. Only marginal differences were apparent with different MALTRINS (results not shown). Modified β-cyclodextrin (etherified) with obscured hydroxyl groups and gum acacia, however, were less effective in protection of CCMP (as seen above in Table 13).

Protection of CCMP by β-cyclodextrin may arise from full or partial inclusion of CCMP in its central cavity or simply by its becoming surrounded with β-cyclodextrin. In general to form inclusion compounds, the material to be encapsulated is added to a warm aqueous solution of β-cyclodextrin. Equilibrium is attained with intense stirring. During slow cooling, the inclusion complex precipitates and afterwards is recovered by filtration. On the other hand, water may be removed from the system by freeze-, drum-, or spray-drying. In our studies, however, CCMP was added to a basic solution of β-cyclodextrin at room temperature. Since precipitation of the mixture under those conditions is unlikely, dehydration was accomplished by spray-drying. Moreover, sensitivity of CCMP necessitated a short-time handling to retard possible decomposition. Despite excellent encapsulating ability, β-cyclodextrin is not yet permitted as a food ingredient in some countries. Nonetheless, stabilization of some food ingredients, e.g. anthocyanin pigments, food flavors and fatty acids in β-cyclodextrin has been reported. Debittering of grapefruit juice and enhancement of water solubility has been achieved. In fact, β-cyclodextrin has often been used as a model for studying the interaction of starch with different compounds.

EXAMPLE XIX—COMBINATIONS OF WALL MATERIALS

In another set of examples, several combinations of the above described wall materials were employed. The major wall material was N-LOK, β-cyclodextrin, modified β-cyclodextrin, or MALTRIN M-250. Generally, addition of gum acacia to combinations containing above wall materials improved their performance as it was noticeable in Hunter a values of PCCMP-treated meats (as seen above in Table 12). Furthermore, in all cases examined, addition of a 5% mixture of STPP/SAPP/AP (2:2:1, w/w/w) to wall material(s) improved performance of the encapsulated pigment. Larger Hunter a values were evident where this mixture was present (as seen above in Table 13). A similar visual color effect was observed when polyphosphates were added to CCMP-treated meats. Yield of encapsulated pigment per spray-drying run in laboratory experiments, averaged between 59 and 68% and did not exceed 76%, in all cases reported in Table 13 (above). Impinging of atomized particles on the drying chamber of the spray dryer was found to be responsible for product loss in these laboratory-sale experiments.

The effect of washing of CCMP with an AA solution prior to encapsulation, to remove any unbound nitrite, on Hunter L, a, b values of treated meats is given in Table 14.

TABLE 14

Effect of washing on the removal of residual nitrite and the color of CCMP-treated meats.[1]

| Washings[2] | Hunter Values | | |
|---|---|---|---|
| | L | a | b |
| 0 | 56.7 ± 0.2$^b$ | 11.7 ± 0.2$^a$ | 9.7 ± 0.1$^a$ |
| 1 | 56.0 ± 0.2$^c$ | 11.3 ± 0.1$^b$ | 9.7 ± 0.1$^a$ |
| 2 | 55.8 ± 0.1$^c$ | 11.1 ± 0.1$^{bc}$ | 9.9 ± 0.2$^a$ |
| 3 | 55.3 ± 0.2$^d$ | 11.0 ± 0.2$^{bc}$ | 9.8 ± 0.1$^a$ |
| (1) Encapsulated | 57.6 ± 0.2$^a$ | 12.0 ± 0.1$^a$ | 9.8 ± 0.2$^a$ |
| (2) Encapsulated | 56.1 ± 0.2$^c$ | 10.8 ± 0.2$^c$ | 9.9 ± 0.1$^a$ |

[1]CCMP was prepared from hemin-nitrite oxide synthesis.
[2]CCMP was washed with a 2% (w/v) ascorbic acid solution. Encapsulated were prepared from unwashed (1) and washed pigment (2) using N-LOK as wall material.

As seen above, in Table 14, a significant (P<0.05) decrease in Hunter a values of cooked meats treated with CCMP after washing(s) with the AA solution was observed, thus indicating, that presence of any residual nitrite enhances the color effect of CCMP. Washing with AA solution probably eliminated all residual nitrite, therefore affording true color measurements. Encapsulation of unwashed CCMP and subsequent application of the pigment to meat, after cooking, gave a Hunter a value statistically identical to that of unwashed CCMP-treated meat. Moreover, encapsulation of washed CCMP conferred to meats Hunter a values similar to those of their washed CCMP-treated counterparts.

Stability of CCMP stored up to 9 months in amber-colored ampules and under a positive pressure of nitric oxide was tested by examining its absorption maxima at 540 and 563 nm. Absorbance values of pigments did not change significantly (P>0.05) from those of freshly prepared counterparts over the test period (as seen below in Table 15).

TABLE 15

Stability of preformed cooked cured-meat pigment (CCMP) under a nitric oxide atmosphere.[1]

| Storage Period, Month | A$_{540}$ | A$_{563}$ |
|---|---|---|
| 0 | 0.345 ± 0.005$^a$ | 0.352 ± 0.003$^a$ |
| 3 | 0.342 ± 0.004$^a$ | 0.351 ± 0.002$^a$ |
| 6 | 0.343 ± 0.005$^a$ | 0.350 ± 0.002$^a$ |
| 9 | 0.339 ± 0.006$^a$ | 0.348 ± 0.003$^a$ |

[1]Hunter L, a, b values of meats treated with pigment after 9 mo of storage were 57.6, 11.4 and 9.1, respectively. Nitrite-cured meat had respective values of 58.0, 11.7 and 9.1.

After the 9 month storage period, pigment was applied to ground pork. Furthermore, a control sample using freshly prepared CCMP was used for comparison. The color quality of these samples, as judged by Hunter L, a, b values, was not significantly (P>0.05) different and changed from 57.8±0.1, 11.8±0.1 and 9.2±0.1 (control) to 57.5±0.1, 11.5±0.1 and 9.1±0.2.

EXAMPLE XX—EFFECT OF STORAGE

The effect of storage of PCCMP and its performance was monitored. Hunter a values of treated meats as a function of storage time generally indicated that the coloring quality of PCCMP was primarily dictated by its initial color properties (as seen below in Table 16).

TABLE 16

Effect of storage on Hunter L, a, b values of meats cooked with powdered cooked cured-meat pigment (PCCMP).[a]

| Experiment Number | Wall Material(s) | Storage Time (Months) | L | Hunter Values[2] a | b |
|---|---|---|---|---|---|
| 1 | N-LOK | 0 | 54.0 ± 0.2 | 11.9 ± 0.2$^{bcd}$ | 9.2 ± 0.1$^{ef}$ |
|   |   | 9 | 57.2 ± 0.1$^{ab}$ | 10.9 ± 0.2$^g$ | 9.7 ± 0.2$^{abcd}$ |
| 2 | N-LOK (95%) + COMBO (5%) | 0 | 52.8 ± 0.2$^p$ | 12.9 ± 0.1$^a$ | 9.1 ± 0.1$^f$ |
|   |   | 2.5 | 55.2 ± 0.1$^{ghij}$ | 12.1 ± 0.2$^{bd}$ | 9.4 ± 0.2$^{cdef}$ |
|   |   | 9 | 55.7 ± 0.1$^{efgh}$ | 12.0 ± 0.2$^{bcd}$ | 9.4 ± 0.2$^{cdef}$ |
|   |   | 18 | 55.8 ± 0.1$^{efg}$ | 11.7 ± 0.2$^{cde}$ | 9.2 ± 0.2$^{ef}$ |
| 3 | N-LOK (95%) + Gum Acacia (5%) | 0 | 53.2 ± 0.2$^p$ | 12.4 ± 2$^{ab}$ | 9.1 ± 0.2$^f$ |
|   |   | 2.5 | 53.2 ± 0.1$^p$ | 12.3 ± 0.1$^b$ | 9.2 ± 0.2$^{ef}$ |
|   |   | 9 | 53.4 ± 0.2$^{nop}$ | 12.3 ± 0.2$^b$ | 9.2 ± 0.2$^{ef}$ |
| 4 | β-cyclodextrin | 0 | 54.7 ± 0.1$^{jkl}$ | 11.7 ± 0.1$^{cde}$ | 9.1 ± 0.1$^f$ |
|   |   | 11 | 55.3 ± 0.2$^{ghij}$ | 11.2 ± 0.2$^{efg}$ | 9.2 ± 0.1$^{ef}$ |
| 5 | β-cyclodextrin (95%) + COMBO (5%) | 0 | 55.1 ± 0.2$^{hij}$ | 11.5 ± 0.1$^{def}$ | 9.3 ± 0.1$^{def}$ |
|   |   | 4 | 56.5 ± 0.2$^{cd}$ | 11.0 ± 0.2$^{fg}$ | 9.8 ± 0.1$^{abc}$ |
|   |   | 18 | 56.2 ± 0.2$^{def}$ | 11.0 ± 0.2$^{fg}$ | 9.7 ± 0.2$^{abcd}$ |
| 6 | β-cyclodextrin (95%) + Gum Acacia (5%) | 0 | 55.0 ± 0.1$^{ijk}$ | 11.6 ± 0.2$^{cde}$ | 9.4 ± 0.1$^{cdef}$ |
|   |   | 4 | 56.3 ± 0.2$^{de}$ | 11.2 ± 0.3$^{efg}$ | 9.6 ± 0.1$^{abcde}$ |
| 7 | Modified β-cyclodextrin | 0 | 54.0 ± 0.5$^{mn}$ | 9.0 ± 0.1$^f$ | 9.6 ± 0.1$^{abcde}$ |
|   |   | 4 | 54.9 ± 0.3$^{jk}$ | 8.6 ± 0.2$^f$ | 9.7 ± 0.2$^{abcd}$ |
| 8 | Maltrin H-250 | 0 | 53.3 ± 0.2$^{op}$ | 11.6 ± 0.1$^{cde}$ | 9.7 ± 0.2$^{abcd}$ |
|   |   | 4 | 55.6 ± 0.1$^{fghi}$ | 10.9 ± 0.2$^g$ | 9.9 ± 0.1$^{abc}$ |
| 9 | Maltrin (95%) + COMBO (5%) | 0 | 54.4 ± 0.2$^{klm}$ | 12.3 ± 0.1$^b$ | 9.2 ± 0.2$^{ef}$ |
|   |   | 11 | 56.0 ± 0.1$^{def}$ | 11.2 ± 0.3$^{efg}$ | 9.7 ± 0.2$^{abcd}$ |
| 10 | N-LOK (85% + β-cyclodextrin (15%) | 0 | 53.9 ± 0.1$^{mo}$ | 11.0 ± 0.1$^{fg}$ | 9.5 ± 0.2$^{bcdef}$ |
|   |   | 9 | 55.6 ± 0.1$^{fghi}$ | 10.1 ± 0.1$^h$ | 9.6 ± 0.1$^{abcde}$ |
| 11 | Maltrin (85%) + β-cyclodextrin (15%) | 0 | 54.1 ± 0.1$^{lm}$ | 11.9 ± 0.1$^{bcd}$ | 9.2 ± 0.1$^{ef}$ |
|   |   | 11 | 56.0 ± 0.1$^{def}$ | 11.2 ± 0.2$^{efg}$ | 9.7 ± 0.1$^{abcd}$ |
| 12 | (10) (95%) + COMBO (5%) | 0 | 54.2 ± 0.5$^{lm}$ | 11.6 ± 0.1$^{cde}$ | 9.3 ± 0.1$^{def}$ |
|   |   | 11 | 57.3 ± 0.1$^{ab}$ | 11.2 ± 0.3$^{efg}$ | 9.7 ± 0.1$^{abcd}$ |
| 13 | Gum Acacia | 0 | 57.0 ± 0.3$^{bc}$ | 8.9 ± 0.1$^f$ | 9.9 ± 0.2$^{abc}$ |
|   |   | 4 | 57.7 ± 0.3$^a$ | 8.7 ± 0.1$^f$ | 10.0 ± 0.1$^a$ |

[1]All samples were cooked with 20% (w/w) distilled water, 550 ppm sodium ascorbate and contained 50 ppm PCCMP. COMBO refers to a combination of STPP/SAPP/AP (2:2:1, w/w/w).
[2]Mean values of 3 replicates ± standard deviation. Values bearing same superscripts are not significantly (P > 0.05) different from one another.

As seen in Table 16, the color of samples encapsulated with modified β-cyclodextrin remained less desirable as their Hunter a values were more than one unit below those of nitrite-cured counterparts. Samples containing STPP/SAPP/AP combinations or gum acacia had more desirable coloring properties thus indicating that protected pigments retained their structural integrity. However, when pigments were stored at room temperature, their stability was adversely affected (results not shown). Therefore, it is believed that encapsulated pigments should be preferably stored at refrigeration temperatures to enhance shelf-life.

EXAMPLE XXI—EFFECT OF LIGHT ON STABILITY

Finally, effect of intense fluorescent lighting on color stability of meats treated with PCCMP was examined. Typical results using encapsulating materials with different protection characteristics, as judged by initial Hunter a values of freshly encapsulated pigment are reported. In all cases, a drastic reduction in Hunter a values was observed during the first 6 h of fluorescent lighting (see FIG. 8). The ultimate Hunter a value, after an 18 h exposure was near that observed for meats cured with 156 ppm sodium nitrite (±1 Hunter a value). Nonetheless, this value depended to some extent on the initial color values of treated meat samples as well as the total concentration of pigments in the muscle tissue homogenates.

Thus, CCMP may be stabilized effectively by either storing it under a positive pressure of nitric oxide or by its encapsulation in food-grade starch-based wall materials. Although stablized pigments prepared by both methods had similar color qualities, PCCMP may be more practical for use by processors. Color stability of treated meat products was similar to their nitrite-cured analog. Thus, presence of residual nitrite may not play an important role in color stability of cured meats under extreme conditions.

EXAMPLE XXII—CONTROL OF LIPID AUTOXIDATION IN CURED MEATS

Lipids are an integral constituent of muscle foods and contribute towards the overall flavor of cooked products. Adipose tissue serves as a depot of fat-soluble compounds. Upon heating, these compounds volatilize and contribute towards the desirable and characteristic flavor of freshly cooked meats. Lipids are primarily responsible for development of species-specific flavor notes, however, they are prone to oxidation and as such the palatability of meats may be affected. Moreover, products so formed may have adverse health effects. Phospholipids are most susceptible to autoxidation and breakdown products formed, e.g., malonaldehyde, pentanal and hexanal are known to be correlated to off-flavor development in uncured meats.

On the other hand, cured meats exhibit, a distinct and pleasing flavor which does not change significantly after prolonged refrigerated storage. Only as little as 10–40 ppm of sodium nitrite was found necessary to attain the characteristic color and flavor of nitrite-cured meats. Nitrite acts as a strong antioxidant in cured meats and thus prevents lipid autoxidation/warmed-over flavor (WOF) development. Furthermore, it eliminates the formation of overtone carbonyl compounds which obscure the true-to-nature flavor of cooked meats without being influenced by their lipid components. Based on these observations, it was suggested that the true nature of meat flavor may indeed be that of cured meat. Use of alternative curing systems involving an antioxidant and a sequesterant to duplicate the action of nitrite has been provided by the present invention.

A suitable process of application of the compositions, of previously mentioned U.S. Pat. Nos. 3,899,600 and 4,599,234, to meat, according to the present invention involves dissolving the water-soluble ingredients in water, applying the water-insoluble ingredients to meat, and then combining the modified meat and water-based solution. The proportion of components employed in such a process measured per unit wet weight of meat and meat additives may be ~2% salt; ~1.5% sugar; in the range of 6 to 24 ppm (preferably ~12 ppm) of (di)nitrosyl ferrohemochrome; below 400 ppm (preferably below 200 ppm) of antioxidant; below 1000 ppm (preferably ~500 ppm) of a non-phosphate sequestering agent; and below 6000 ppm (preferaby ~3000 ppm) of a phosphate containing sequestering agent; and below 6000 ppm (preferably ~3000 ppm) of an antimicrobial agent. Thus, an essentially nitrite-free meat product, indistinguishable in color and flavor from nitrite-cured meat may be produced.

EXAMPLE XXIII—ANTIOXIDANT EFFECTS

To reproduce the antioxidant effect of nitrite, a number of antioxidants, sequesterants, their combinations, and CCMP was examined in cooked meats. Amongst antioxidants used, BHA and TBHQ, at a concentration of 30 ppm, were the most effective. Oxidation of treated meats during a 5-week storage period at 4° C. was delayed as monitored by the TBA test. As shown below, Table 17 provides the TBA numbers of cooked meats treated with different additives.

TABLE 17

TBA numbers of cooked meats treated with different additives after a 5-week storage period at 4° C.[1]

| Expt. No. | Additive(s) | TBA Number |
|---|---|---|
| 1 | None | 15.46 |
| 2 | BHA (30 ppm) | 0.44 |
| 3 | TBHQ (30 ppm) | 0.35 |
| 4 | STPP (3000 ppm) | 1.86 |
| 5 | SPP (3000 ppm) | 1.66 |
| 6 | SHMP (3000 ppm) | 7.71 |
| 7 | Na$_2$EDTA (500 ppm) | 0.96 |
| 8 | (4) + SA (550 ppm) | 0.27 |
| 9 | (5) + SA (550 ppm) | 0.23 |
| 10 | (6) + SA (550 ppm) | 0.29 |
| 11 | (8) + (2) | 0.20 |
| 12 | (8) + (3) | 0.18 |
| 13 | CCMP (12 ppm) | 9.89 |
| 14 | (11) + (13) | 0.34 |
| 15 | (12) + (13) | 0.24 |
| 16 | (14) + SHP (3000 ppm) | 0.28 |
| 17 | (15) + SHP (3000 ppm) | 0.21 |
| 18 | NaNO$_2$ (150 ppm) | 0.63 |

[1]Additives were: butylated hydroxyanisole, BHA; tert-butylhydroquinone, TBHQ; sodium tripolyphosphate, STPP; sodium pyrophosphate, SPP; sodium hexametaphosphate, SHMP; disodium salt of ethylenediaminetetraacetate acid, Na$_2$EDTA; sodium ascorbate, SA; cooked cured-meat pigment, CCMP; and sodium hypophosphate, SHP.

In fact, TBA values of BHA- and TBHQ-treated meats were even lower than those obtained for nitrite-cured meats. Furthermore, such antioxidants conferred a positive influence on sensory characteristics of treated cooked-meat systems as noted by untrained panelists. Interestingly enough however, CCMP exhibited a weak but noticeable antioxidative action of its own. Similar antioxidative properties for this pigment were observed in a linoleate/β-carotene system (results not shown). Amongst food-grade sequesterants examined, STPP, SPP, and Na$_2$EDTA were the most effective at retarding lipid oxidation.

EXAMPLE XXIV

In another set of experiments, the oxidative stability of cooked ground pork treated with AA together with CA or mixed tocopherols was examined. The results of this example are presented below in Table 18, which summarizes the antioxidant activity of ascorbic acid (AA), citric acid (CA), tocopherols (TOC) and/or their combinations as reflected by 2-thiobarbituric acid (TBA) values of treated comminuted pork after cooking.

TABLE 18

Antioxidant activity of ascorbic acid, citric acid, tocopherols and/or their combinations as reflected by 2-thiobarbituric acid (TBA) values of treated comminuted pork after cooking.[1]

| Expt. No. | Additive (ppm) | Storage Time, Days | | | |
|---|---|---|---|---|---|
| | | 0 | 7 | 14 | 21 |
| 1 | None | 5.7 | 11.9 | 15.3 | 14.5 |
| 2 | AA (500) | 0.5 | 4.8 | 5.7 | 5.9 |
| 3 | AA (1000) | 0.2 | 1.9 | 2.8 | 2.8 |
| 4 | AA (2000) | 0.2 | 0.8 | 0.9 | 1.1 |
| 5 | CA (500) | 1.3 | 7.1 | 8.5 | 7.6 |
| 6 | CA (1000) | 0.9 | 6.3 | 6.6 | 9.1 |
| 7 | CA (2000) | 0.6 | 4.3 | 5.1 | 5.7 |
| 8 | CA (3000) | 0.3 | 2.3 | 5.2 | 4.0 |
| 9 | TOC (30) | 3.9 | 8.2 | 10.3 | 9.7 |
| 10 | TOC (200) | 3.1 | 8.8 | 10.6 | 11.1 |
| 11 | TOC (400) | 2.7 | 7.9 | 10.0 | 10.9 |
| 12 | (2) + (10) | 0.6 | 2.6 | 4.9 | 3.1 |
| 13 | (3) + (10) | 0.3 | 0.9 | 1.4 | 1.7 |
| 14 | (4) + (10) | 0.1 | 0.6 | 0.8 | 1.1 |
| 15 | (4) + (11) | 0.1 | 0.4 | 0.5 | 0.7 |
| 16 | (2) + (5) | 0.2 | 0.5 | 1.2 | 1.6 |
| 17 | (2) + (6) | 0.1 | 0.5 | 1.0 | 1.8 |
| 18 | (3) + (5) | 0.1 | 0.4 | 0.2 | 0.5 |
| 19 | (3) + (6) | 0.1 | 0.4 | 0.2 | 0.6 |
| 20 | (4) + (7) | 0.1 | 0.3 | 0.4 | 0.5 |

[1]Meats contained 20% (w/w) water. Additives were: ascorbic acid, AA; citric acid, CA; and tocopherols (Covi-Ox ®), TOC.

EXAMPLE XXV

The effect of SA and polyphosphates on oxidative state of cooked meats was studied. These additives lowered TBA numbers by a factor of approximately 2 and 4, respectively, and when used in combination, a strong synergism was observed (see FIG. 9). Content of hexanal and other lipid oxidation-derived flavor compounds of meats treated with STPP and/or SA was similarly reduced and spectra of flavor volatiles of meats were simplified, and were similar to nitrite-cured counterparts. Both SA and STPP alone lowered the quantity of hexanal in meat and when used in combination, a strong synergistic action was observed. Good correlations between TBA values and sensory data, as well as between hexanal content of meats and their sensory acceptability existed (results not shown). Furthermore, addition of BHA, TBHQ or nitrite, at a level of 30 ppm, had a further action in reducing the amount of hexanal, however, the major effect was due to combination of SA and STPP. Flavor acceptability of nitrite-free treated samples was not determined as being different from their nitrite-cured analogues as it was judged by our untrained panelists. Consequently, it appears that nitrite may not be an essential ingredient for development of characteristic flavor of (certain) cured-meat products. Moreover, the antioxidative properties of a number of polyphosphate chelating agents, with or without added sodium erythorbate, on development of warmed-over flavor and rancidity in ground chicken meat were investigated. SAPP was best in retarding lipid oxidation in cooked ground chicken leg and breast meats. Sodium erythorbate acted as a strong synergist with polyphosphates, in general. Soaking of chicken meats in STPP solutions, prior to cooking, had some beneficial effect on their oxidative stability. An apparent improvement in texture and flavor of treated chicken samples was also observed.

EXAMPLE XXVI—EFFECT OF PHENOLIC COMPOUNDS

The effect of several naturally-occurring phenolic compounds, some found in meat extenders of plant origin and some found in seasonings used in meat processing, on oxidative stability of cooked comminuted pork was studied. Phenolic compounds, namely kaempferol, quercetin, rutin, eugenol, isoeugenol and cinnamic, coumaric, ferulic, ellagic, vanillic, gallic, syringic, chlorogenic and 3,5-dimethoxy-4-hydroxycinnamic (DMHC) acids were used at 30 and/or 200 ppm levels of addition. Antioxidative effect of quercetin, ellagic acid, eugenol and isoeugenol followed by kaempferol, DMHC acid, ferulic acid and gallic acid was superior to that of other compounds tested. Antioxidant activity of all phenolic compounds studied was superior to that of α-tocopherol, at 200 ppm, and was better or similar to that of nitrite, at 25 or 50 ppm level of addition. Results from some typical compounds tested are given below in Table 18 and are compared with that of nitrite at a 156 ppm addition level for their efficiency in retarding lipid oxidation.

TABLE 19

Antioxidant activity of individual plant phenolics, as reflected by 2-thiobarbituric acid (TBA) values of treated comminuted pork after cooking.[1]

| Phenolic Compound (ppm) | Storage Time, Days | | | |
|---|---|---|---|---|
| | 1 | 7 | 14 | 21 |
| None | 3.1 | 5.3 | 6.5 | 9.1 |
| Ellagic Acid (30) | 0.1 | 0.1 | 0.1 | 0.1 |
| Ellagic Acid (200) | 0.1 | 0.1 | 0.1 | 0.1 |
| Eugenol (30) | 1.4 | 1.5 | 3.0 | 4.3 |
| Eugenol (200) | 0.3 | 0.4 | 0.4 | 0.4 |
| Isoeugenol (30) | 0.7 | 0.6 | 2.2 | 2.7 |
| Isoeugenol (200) | 0.2 | 0.2 | 0.1 | 0.1 |
| Quercetin (30) | 0.2 | 0.3 | 0.4 | 0.4 |
| Quercetin (200) | 0.1 | 0.1 | 0.1 | 0.1 |
| Kaempferol (30) | 1.9 | 4.0 | 5.1 | 4.0 |
| Kaempferol (200) | 0.6 | 1.0 | 1.9 | 1.8 |
| Rutin (200) | 1.8 | 3.0 | 4.0 | 4.1 |
| Cinnamic Acid (200) | 2.8 | 4.1 | 4.6 | 6.8 |
| Coumaric Acid (200) | 2.4 | 2.9 | 4.5 | 4.2 |
| Ferulic Acid (200) | 1.2 | 3.0 | 4.2 | 4.0 |
| Caffeic Acid (200) | 0.9 | 1.6 | 2.1 | 2.8 |
| Vanillic Acid (200) | 2.0 | 4.0 | 4.8 | 7.0 |
| Gallic Acid (200) | 0.8 | 1.2 | 2.1 | 2.4 |
| Syringic Acid (200) | 1.5 | 2.1 | 3.3 | 4.1 |
| Chlorogenic Acid (200) | 1.1 | 1.7 | 3.7 | 5.9 |
| DMHC (200) | | | | |

[1]Meats consisted of 20% (w/w) distilled water. DMHC, 3,5-dimethoxy-4-hydroxycinnamic acid.

EXAMPLE XXVII

The antioxidant activity of spices and/or their corresponding oleoresins in meat systems was tested. Clove and sage followed by rosemary proved to possess the best antioxidant action of the spices examined. Results sumarized below in Table 20 show the antioxidant activity of selected spices as reflected by 2-thiobarbituric acid (TBA) values of treated comminuted pork after cooking.

TABLE 20

Antioxidant activity of selected spices as reflected by 2-thiobarbituric acid (TBA) values of treated comminuted pork after cooking.[1]

| Spice | Storage Time, Days | | | | |
|---|---|---|---|---|---|
| | 1 | 7 | 14 | 21 | 28 |
| None | 4.2 | 8.5 | 8.7 | 9.5 | 11.0 |
| Clove | 0.4 | 0.1 | 0.1 | 0.1 | 0.2 |
| Sage | 0.4 | 0.4 | 0.5 | 0.5 | 0.6 |
| Sage (added after cooking) | 0.6 | 1.0 | 1.3 | 1.2 | 1.2 |
| Rosemary | 0.5 | 0.7 | 0.8 | 0.2 | 0.8 |
| Oregano | 1.4 | 1.7 | 1.2 | 1.6 | 1.5 |
| Thyme | 2.2 | 2.4 | 2.4 | 2.5 | 2.6 |
| Ginger | 2.3 | 3.5 | 3.0 | 2.6 | 2.7 |

[1]Meat systems contained 20% (w/w) water. Spices were added at a 1000 ppm level.

EXAMPLE XXVIII

On the other hand, their corresponding oleoresins exhibited only a slight effect as reflected in their TBA values (as seen below in Table 21).

TABLE 21

Antioxidant activity of spice oleoresins as reflected by 2-thiobarbituric acid (TBA) values of treated comminuted pork after cooking.[1]

| Spice Oleoresin | Storage Time, Days | | | | |
|---|---|---|---|---|---|
| | 1 | 7 | 14 | 21 | 28 |
| None | 4.2 | 8.5 | 8.7 | 9.5 | 11.0 |
| Clove Oleoresin | 1.4 | 2.8 | 2.7 | 2.8 | 2.8 |
| Oregano Oleoresin | 1.4 | 4.3 | 4.3 | 3.8 | 3.9 |
| Sage Oleoresin | 1.7 | 4.6 | 4.6 | 4.5 | 4.5 |
| Ginger Oleoresin | 2.0 | 4.9 | 4.7 | 4.7 | 4.8 |
| Thyme Oleoresin | 2.9 | 5.8 | 6.6 | 7.1 | 6.8 |
| Rosemary Oleoresin | 3.1 | 6.7 | 7.8 | 7.4 | 7.4 |

[1]Meat systems contained 20% (w/w) water. Spices were added to meats at a 200 ppm level.

EXAMPLE XXIX

The antioxidant activity of combinations of spices and their respective oleoresins did not show any synergism (as seen in Table 22).

TABLE 22

Antioxidant activity of selected spices and their oleoresins as reflected by 2-thiobarbituric acid (TBA) values of treated comminuted pork after cooking.[1]

| Spice | Storage Time, Days | | | | |
|---|---|---|---|---|---|
| | 1 | 7 | 14 | 21 | 28 |
| None | 4.2 | 8.5 | 8.7 | 9.5 | 11.0 |
| Clove | 0.3 | 0.1 | 0.1 | 0.1 | 0.2 |
| Sage | 0.4 | 0.4 | 0.3 | 0.4 | 0.6 |
| Rosemary | 0.5 | 1.3 | 1.1 | 1.2 | 0.9 |
| Oregano | 0.4 | 0.7 | 0.6 | 0.8 | 0.8 |
| Thyme | 1.9 | 2.7 | 2.8 | 3.1 | 2.2 |
| Ginger | 0.9 | 2.2 | 1.6 | 1.7 | 1.8 |

[1]Meat systems contained 20% (w/w) water. Spices were added to 1000 ppm together with 200 ppm of their oleoresins.

EXAMPLE XXX

Protein extenders of plant origin are often used in meat emulsion systems. Often these extenders and binders possess antioxidant effects. Table 23 below shows that deheated mustard flour (DMF), in addition to minimizing the cooking loss, had an impressive antioxidant property and this was somewhat concentration-dependent.

TABLE 23

Antioxidant activity of deheated mustard flour (DMF) as reflected in the 2-thiobarbituric acid (TBA) of comminuted pork after cooking.[1]

| DMF, % | Storage Time, Days | | | | |
|---|---|---|---|---|---|
| | 0 | 1 | 3 | 7 | 14 |
| None | 0.8 | 1.5 | 5.6 | 5.4 | 5.5 |
| 0.5 | 0.6 | 1.3 | 2.1 | 1.4 | 1.1 |
| 1.0 | 0.4 | 0.7 | 0.9 | 1.3 | 1.0 |
| 1.5 | 0.3 | 0.5 | 0.6 | 1.3 | 0.8 |
| 2.0 | 0.2 | 0.5 | 0.6 | 1.0 | 0.6 |

[1]Meat systems contained 20% (w/w) water. Samples contain 1525 mg phenolics/100 g.

EXAMPLE XXXI

Cured-meat flavor is a composite sensation arising from the cumulative effect of many compounds. Although the presence of yet unappreciated substances, in minute quantities, may be responsible for cured flavor, there is no doubt that nitrite influences flavor of cured meats by virtue of its antioxidative properties and stabilization of microsomal lipids and heme pigments. Analyses of aldehydes in meats was achieved by their separation on a fused-silica capillary column using a gas chromatography known by the Trade-mark PERKIN ELMER Model 8500 gas chromatograph equipped with a HS-6 head space analyzer. Two grams of meat were transferred to each head space vial and then capped and crimped. Each vial was inserted into the HS-6 magazine assembly, set at 90° C., 45 min prior to injection to allow equilibrium to establish between meat and its headspace volatiles. The oven temperature was set at 35° C. for 12 min and then ramped to 220° C. at a rate of 30° C./min and then held there for an additional 3 min. The concentration of carbonyl compounds produced from autoxidation of meat lipids was markedly reduced by addition of nitrite. Similar results were obtained when combinations containing polyphosphates, ascorbates and low levels of an antioxidant or some of our other combinations containing all-natural ingredients were used. Typical results for concentration of major carbonyl compounds in a nitrite-free cured meat system are given in Table 24.

TABLE 24

| Carbonyl Compound | Relative Concentration | | |
|---|---|---|---|
| | Uncured | Nitrite Cured[1] | Nitrite-Free Cured[2] |
| Hexanal | 100 | 7.0 | 6.5 |
| Pentanal | 31.3 | 0.5 | 0.5 |
| Heptanal | 3.8 | <0.5 | 0.5 |
| Octanal | 3.6 | <0.5 | 0.5 |
| 2-Octenal | 2.6 | — | — |
| Nonanal | 8.8 | 0.5 | 0.7 |
| 2-Nonenal | 1.0 | — | — |
| 5-Decanal | 1.1 | — | <0.1 |
| 2-Undecenal | 1.4 | 0.5 | 0.5 |
| 2,4-Decadienal | 1.1 | — | <0.1 |

[1]Sample contained 20% (w/w) water and 550 ppm sodium ascorbate.
[2]Sample contained the pre-formed cooked cured-meat pigment. 12 ppm; sodium tripolyphosphate, 3000 ppm; sodium ascorbate, 550 ppm and tert-butylhydroquinone, 30 ppm.

Furthermore, concentration of some of the flavor components responsible for meaty aroma of cooked meats was proportionally affected. Thus, treated meats preserved their desired flavor characteristics and in most cases were indistinguishable in comparison with their nitrite-cured analogues.

EXAMPLE XXXII—ANTIMICROBIAL ACTION OF NITRITE AND ITS ALTERNATIVES

Nitrite exerts a concentration-dependent antimicrobial effect in cured meat products and inhibits outgrowth of *Clostridium botulinum*. The degree of protection provided depends on concentration of residual nitrite present, duration of temperature abuse and contamination. Nitrite also retards microbial spoilage of cured meats by anaerobic and aerobic spore-forming bacteria. Mechanism(s) by which nitrite inhibits outgrowth of spores and growth of vegetative cells and microorganisms is not fully understood. It appears however that a reaction with iron-containing enzymes is involved. A better understanding of the exact mechanism(s) of the antimicrobial role of nitrite is still needed.

To take advantage of all positive aspects of nitrite and yet eliminate/reduce chance of N-nitrosamine formation, the application of low levels of nitrite (10–40 ppm) has been studied. These, with or without several alternative antimicrobial agents in meat systems, have been tested by different investigators. The compound of choice must be at least as effective as nitrite; be safe; be heat stable; be flavorless, and; be preferably effective at low concentrations. Amongst antimicrobial agents investigated, para-hydroxybenzoic acid esters (parabens) were found to be good candidates as inhibitors in microbiological media. However, their effectiveness in meat against *C. botulinum* was questionable. Moreover, potassium sorbate at a level of 2600 ppm exhibited antibotulinal activity equivalent to that of nitrite at a concentration of 156 ppm. In combination with 40 ppm of nitrite, potassium sorbate was found to reduce the extent of N-nitrosamine formation from nearly 100 ppb to less that 5 ppb. Sensory data on use of 120 ppm or 40 ppm of nitrite in combination with 2600 ppm of potassium sorbate has shown no product difference between color and panel scores of the two sets of experiments. Potassium sorbate is a white crystalline compound and has a GRAS (generally recognized as safe) status.

Sodium hypophosphite (SHP), another candidate, was found to be quite effective. At 3000 ppm or at 1000 ppm in combination with 40 ppm nitrite, SHP provided antibotulinal protection to meat products which was similar to that provided by 120 ppm of nitrite. It has been reported that bacon processed with 3000 ppm SHP has a flavor as desirable as conventially-processed bacon.

Methyl and ethyl esters of fumaric acid at 1250 to 2500 ppm levels of addition have been reported to display antibotulinal activity similar to that provided by nitrite. Methyl fumarate-treated samples were sensorially indistinguishable from that of their nitrite-cured counterparts.

Lactic acid, its sodium or potassium salts, or lactic acid-producing microorganisms may also be used in providing microbial stability to muscle foods. Incorporation of lactic acid, preferably in the encapsulated form, or lactic acid-producing bacteria together with fermentable carbohydrates in cured-meat formulations is permitted to reduce the pH. Excellent protection against formation of botulinum toxin has been achieved in bacon using these bacteria and sucrose without the presence of nitrite. While lactic acid, as such, may also be used for surface treatment, use of lactate salts as a component of muscle foods may prove beneficial.

Several nitrite-free combinations consisting of CCMP, a sequesterant and/or an antioxidant and an antimicrobial agent were formulated for meat curing. These mixtures were found effective in reproducing the color, the oxidative stability and flavor, as well as the antimicrobial action of nitrite. Other combinations composed of more readily acceptable formulations have recently been reported (as seen below in Table 25), which shows the effect of treatment composition on gas and toxin production by C. botulinum in meats.

Of the above antimicrobial agents/processes, lactates and radiation sterilization perhaps offer the best safe alternatives to nitrite. The human body produces approximately 130 grams of lactic acid on a daily basis, thus, its use at levels of up to 2-3% may be regarded as safe. Low-dose radiation sterilization, especially at reduced temperatures, is also an attractive option.

Effects of 5 and 10 kGy γ-irradiation on the color and oxidative stabilities of meats treated with nitrite or a nitrite-free curing system were investigated. Represen-

TABLE 25

Effect of treatment composition on gas and toxin production by G. botulinum in meats.[1]

| Expt. No. | Additives[2] (ppm) | Incubation at 27° C., Days | | | | | | | | |
|---|---|---|---|---|---|---|---|---|---|---|
| | | 1 | 2 | 3 | 4 | 5 | 6 | 7 | 8 | 27 |
| 1 | None | 34/34+ | | | | | | | | |
| 2 | NaNO$_2$ (150) | 0/36− | 11/36+ | 5/18+ | 8/13+ | 3/5[3] | 2/2+ | | | |
| 3 | (2) + SA (550) | 0/36− | 0/32− | 15/30− | 5/14+ | 3/9+ | 4/6+ | 1/2+ | 0/1− | 0/1− |
| 4 | CCMP (12) | 17/17+ | | | | | | | | |
| 5 | (4) + SA (550) | 31/34+ | 3/3+ | | | | | | | |
| 6 | (4) + SHP (3000) | 1/18− | 1/16+ | 2/14+ | 4/12+ | 3/5+ | 1/2+ | 0/1− | 0/1− | 0/1− |
| 7 | (6) + SA (550) + STPP (3000 + TBHQ (200) | 6/35− | 3/27[3] | 1/24− | 6/22+ | 3/16[3] | 5/13+ | 6/8+ | 1/2+ | 0/1− |
| 8 | (7) but with (PS) (2600) instead of SHP | 0/39− | 32/35+ | 3/3+ | | | | | | |
| 9 | (7) but with MMF (1250) Instead of SHP | 0/37− | 1/33− | 17/31+ | 9/18+ | 3/7+ | 3/4+ | 0/1+ | 0/1+ | 0/1− |

[1]Adapted from Wood et al. 1986. Number of packs showing gas production/total number of packs. +, toxin present, −, toxin present.
[2]Additives are sodium ascorbate, SA; cooked cured-meat pigment, CCMP; sodium hypophosphite, SHP; sodium tripolyphosphate, STPP; t-butylhydroquinone, TBHQ; potassium sorbate, PS; and monomethyl fumarate, MMF.
[3]Presence of toxin was not tested.

EXAMPLE XXXIII

The use of radiation sterilization is an established method of microbial inactivation and has been studied as a method of preserving many foodstuffs. It is currently used for sterilization of spices and herbs and sometimes to inhibit sprouting of potatoes. It has also been found effective against C. botulinum in cured meat and has been tested in combination with low concentrations (25-40 ppm) of nitrite in bacon and ham. Thus, irradiation may be used either to substitute for the antimicrobial action of nitrite or to reduce the addition level of nitrite required for its antimicrobial activity.

tative post-rigor pork loin center cuts not exhibiting PSE or DFD characteristics were used for this study. Most of their surface fat was removed and all were ground twice using a HOBART$_{TM}$ meat grinder, as described previously. All comminuted meats were then mixed in one large batch. Meat slurries were prepared by addition of 20% (w/w) of water and 550 ppm SA. Sodium nitrite, CCMP, STPP, and SAPP were added directly to meats at various levels as specified in Table 26, which shows the effect of irradiation on Hunter L, a, b color values of treated meats during 3 weeks of storage.

TABLE 26

Effect of Irradiation on Hunter L, a, b color values of treated meats during 3 weeks of storage.[1]

| Additive(s) | Storage Days | Hunter Values, 0 kGy | | | Hunter Values, 5 kGy | | | Hunter Values, 10 kGy | | |
|---|---|---|---|---|---|---|---|---|---|---|
| | | L | a | b | L | a | b | L | a | b |
| None | 0 | 64.0 ± 0.2$^{bcg}$ | 3.8 ± 0.1$^{lv}$ | 11.5 ± 0.1$^{ab}$ | 63.8 ± 0.1$^{cdef}$ | 4.8 ± 0.1$^{hu}$ | 11.4 ± 0.1$^{ca}$ | 63.6 ± 0.3$^{cde}$ | 4.7 ± 0.2$^{lu}$ | 11.4 ± 0.1$^{bq}$ |
| | 7 | 65.2 ± 0.3$^{abc}$ | 4.7 ± 0.3$^{lu}$ | 11.0 ± 0.4$^{abc}$ | 64.7 ± 0.1$^{bcj}$ | 4.4 ± 0.1$^{hlu}$ | 11.7 ± 0.2$^{bce}$ | 63.1 ± 0.5$^{rdt}$ | 3.6 ± 0.1$^{lv}$ | 11.2 ± 0.4$^{bq}$ |
| | 14 | 65.7 ± 0.4$^{ab}$ | 5.2 ± 0.3$^{hlu}$ | 10.7 ± 0.2$^{bp}$ | 66.0 0.7$^{abc}$ | 4.2 ± 0.1$^{ijv}$ | 11.9 ± 0.2$^{abc}$ | 65.0 ± 0.4$^{abc}$ | 3.1 ± 0.2$^{gv}$ | 11.5 ± 0.2$^{bq}$ |
| | 21 | 65.8 ± 0.5$^{ab}$ | 5.6 ± 0.2$^{hu}$ | 11.0 ± 0.6$^{dp}$ | 66.3 ± 0.6$^{ab}$ | 3.8 ± 0.1$^{lr}$ | 12.2 ± 0.2$^{aa}$ | 66.1 ± 0.6$^{aa}$ | 2.2 ± 0.5$^{hu}$ | 12.4 ± 0.1$^{aa}$ |
| NaNO$_2$ (156 ppm) | 0 | 62.2 ± 0.5$^{defa}$ | 11.7 ± 0.2$^{hu}$ | 8.9 ± 0.1$^{cv}$ | 62.7 ± 0.1$^{cfgv}$ | 11.3 ± 0.2$^{bcu}$ | 9.5 ± 0.1$^{de}$ | 62.3 ± 0.3$^{dce}$ | 11.3 ± 0.2$^{abc}$ | 9.3 ± 0.1$^{ca}$ |
| | 7 | 63.2 ± 03.$^{cde}$ | 10.4 ± 0.1 efcy | 8.4 ± 0.2$^{cdey}$ | 63.3 ± 0.5$^{defv}$ | 9.7 ± 0.1$^{cfgv}$ | 8.8 ± 0.1$^{efu}$ | 63.4 ± 0.1$^{cde}$ | 9.8 ± 0.2$^{cv}$ | 8.7 ± 0.1$^{defgvy}$ |
| | 14 | 63.9 ± 0.5$^{best}$ | 10.2 ± 0.1$^{fgu}$ | 8.4 ± $^{cdef}$ | 64.5 ± 0.1$^{cde}$ | 9.5 ± 0.2$^{fv}$ | 8.7 ± 0.1$^{efgv}$ | 63.7 ± 0.2$^{bct}$ | 9.8 ± 0.2$^{euv}$ | 8.7 ± 0.1$^{defgh}$ |
| | 21 | 65.2 ± 0.8$^{abc}$ | 10.1 ± 0.1$^{gu}$ | 8.3 ± 0.1$^{cdefg}$ | 65.0 ± 0.6$^{abcd}$ | 9.7 ± 0.1$^{gv}$ | 8.8 ± 0.1$^{rfy}$ | 63.8 ± 0.6$^{bcd}$ | 9.9 ± 0.1$^{dcuv}$ | 9.1 ± 0.1$^{cde}$ |
| CCMP (12 ppm) | 0 | 60.0 ± 0.2$^{fjha}$ | 11.8 ± 0.2$^{hu}$ | 8.5 ± 0.1$^{cde}$ | 60.3 ± 0.6$^{ijka}$ | 11.7 ± 0.2$^{abc}$ | 8.8 ± 0.2$^{efa}$ | 60.3 ± 0.6$^{fgha}$ | 11.7 ± 0.2$^{au}$ | 8.8 ± 0.2$^{cdefga}$ |
| | 7 | 61.6 ± 0.8$^{efghi}$ | 10.8 ± 0.2$^{defu}$ | 7.8 ± 0.1$^{efg}$ | 60.2 ± 0.7$^{ijka}$ | 11.0 ± 0.3$^{abc}$ | 9.1 ± 0.1$^{def}$ | 61.0 ± 0.4$^{efga}$ | 10.2 ± 0.5$^{edru}$ | 8.7 ± 0.1$^{delay}$ |
| | 14 | 61.9 ± 0.5$^{defga}$ | 10.4 ± 0.2$^{efgu}$ | 7.7 ± 0.2$^{fg}$ | 61.5 ± 0.1$^{ghfa}$ | 10.9 ± 0.2$^{dcay}$ | 9.1 ± 0.1$^{decay}$ | 61.1 ± 0.3$^{efga}$ | 10.6 ± 0.3$^{bcdru}$ | 8.8 ± 0.1$^{cdefy}$ |
| | 21 | 63.0 ± 0.4$^{cdra}$ | 10.8 ± 0.2$^{defuv}$ | 7.7 ± 0.1$^{fy}$ | 61.7 ± 0.3$^{ghi}$ | 10.9 ± 0.1$^{cdcu}$ | 9.1 ± 0.1$^{dca}$ | 61.6 ± 0.3$^{efk}$ | 10.5 ± 0.1$^{bcdru}$ | 8.9 ± 0.1$^{cdef}$ |
| CCMP (12 pm) + | 0 | 59.2 ± 0.5$^{ja}$ | 17.6 ± 03$^{ab}$ | 8.2 ± 0.2$^{defa}$ | 59.0 ± 0.2$^{ka}$ | 12.1 ± 03$^{ab}$ | 8.2 ± 0.2$^{ba}$ | 58.9 ± 0.2$^{fa}$ | 12.1 ± 0.1$^{au}$ | 8.4 ± 0.1$^{efgha}$ |

TABLE 26-continued

Effect of Irradiation on Hunter L, a, b color values of treated meats during 3 weeks of storage.[1]

| Additive(s) | Storage Days | Hunter Values, 0 kGy | | | Hunter Values, 5 kGy | | | Hunter Values, 10 kGy | | |
|---|---|---|---|---|---|---|---|---|---|---|
| | | L | a | b | L | a | b | L | a | b |
| STPP (3000 ppm) | 7 | 59.9 ± 0.7$^{ijka}$ | 11.6 ± 0.1$^{bcu}$ | 7.9 ± 0.2$^{defa}$ | 60.0 ± 0.3$^{jka}$ | 10.8 ± 0.2$^{defu}$ | 8.1 ± 0.2$^{ha}$ | 60.3 ± 0.7$^{fghd}$ | 10.5 ± 0.3$^{bcdru}$ | 8.1 ± 0.3$^{ha}$ |
| | 14 | 60.4 ± 0.2$^{hijka}$ | 11.4 ± 0.3$^{bcde}$ | 8.1 ± 0.2$^{defa}$ | 60.7 ± 0.5$^{hija}$ | 10.5 ± 0.2$^{defu}$ | 8.2 ± 0.2$^{ha}$ | 61.1 ± 0.4$^{efga}$ | 10.5 ± 0.2$^{bcdru}$ | 8.1 ± 0.2$^{gha}$ |
| | 21 | 61.0 ± 0.3$^{fghfa}$ | 11.2 ± 0.3$^{bcde}$ | 8.1 ± 0.2$^{defa}$ | 60.9 ± 0.5$^{hija}$ | 10.5 ± 0.1$^{defu}$ | 8.2 ± 0.1$^{ha}$ | 61.1 ± 0.2$^{efga}$ | 10.7 ± 0.4$^{bcdr}$ | 8.3 ± 0.2$^{fgha}$ |
| CCMP (12 ppm) + STPP (1500 ppm) + SAPP (1500 ppm) | 0 | 59.3 ± 0.2$^{jka}$ | 12.6 ± 0.1$^{nf}$ | 8.1 ± 0.1$^{defy}$ | 59.7 ± 0.4$^{jka}$ | 12.0 ± 0.3$^{au}$ | 8.5 ± 0.1$^{fgha}$ | 59.6 ± 0.4$^{hfa}$ | 12.1 ± 0.3$^{au}$ | 8.2 ± 0.1$^{ghy}$ |
| | 7 | 59.8 ± 0.7$^{ijka}$ | 11.4 ± 0.2$^{bcde}$ | 7.9 ± 0.2$^{defa}$ | 60.9 ± 0.5$^{hija}$ | 10.4 ± 0.2$^{cfv}$ | 8.2 ± 0.1$^{ha}$ | 60.1 ± 0.3$^{ghfa}$ | 10.7 ± 0.3$^{bcda}$ | 8.2 ± 0.3$^{gha}$ |
| | 14 | 60.7 ± 0.4$^{ghijci}$ | 11.0 ± 0.1$^{cdcu}$ | 7.8 ± 0.1$^{cfy}$ | 60.8 ± 0.1$^{hija}$ | 10.3 ± 0.2$^{fv}$ | 8.2 ± 0.1$^{ha}$ | 59.9 ± 0.4$^{ghij}$ | 10.8 ± 0.4$^{bcuv}$ | 8.3 ± 0.1$^{fgha}$ |
| | 21 | 60.4 ± 0.4$^{hijkl}$ | 11.3 ± 0.1$^{bcde}$ | 8.0 ± 0.2$^{defy}$ | 62.0 ± 0.2$^{fghi}$ | 10.3 ± 0.1$^{fv}$ | 8.3 ± 0.1$^{ghay}$ | 60.2 ± 0.4$^{gijk}$ | 10.7 ± 0.4$^{bdcev}$ | 8.6 ± 0.1$^{defgha}$ |

[1]All samples contain 20% (w/w) distilled water and 500 ppm sodium ascorbate. CCMP, cooked cured-meat pigment; STPP, sodium tripolyphosphate; and SAPP, sodium acid pyrophosphate. Means of determinations ± standard deviations. Means in same column (a-k) or in the same row (s-z) with the same superscript are not different (P > 0.05)

The mixtures were homogenized and then cooked in jars, known by the trademark MASON$_{TM}$, in a thermostat-controlled water bath for 45 min to reach an internal temperature of 75°±2° C. After cooling to room temperature, cooked meat samples from each jar were homogenized and were then divided into 3×100 g batches and vacuum packaged in polyethylene pouches (Eastern Paper Company, St. John's, NF). One pouch of each triplicate treatment was kept as such (control) and the other two sets were irradiated, as described below. All samples were stored over dry ice and were sent to Atomic Energy of Canada Limited (AECL) at Pinawa, Minn. for radiation application.

Prior to irradiation, each sample was thawed overnight at 4° C. and was then placed in a 2 L beaker containing crushed ice. Samples were irradiated in an irradiation apparatus, known by the trademark GAMMACELL 220 (AELL), at a dose rate of 0.180 kGy·min$^{-1}$ for 28 or 55.5 min to obtain 5 and 10 kGy radiation doses, respectively. To measure the absorbed dose, radiometric dye films sealed in polyethylene bags were attached to samples during irradiation. Absorbance of exposed films were then read at 600 nm and the absorbed radiation dose was calculated from a standard curve. The average absorbed dose by samples was 4.21 and 8.84 kGy.

Color of meat samples, both before and after radiation processing was determined using the Gardner colorimeter as described previously. Flavor and oxidative stability of treated meats were monitored by determining their 2-thiobarbituric acid (TBA) values. For all meats treated without nitrite, a 10 g sample was placed in a 500 mL round-bottom flask with 97.5 mL distilled water, 2.5 mL 4N HCl, 3 drops antifoam A emulsion and a couple of glass beads to prevent bumping. For nitrite-cured meats, if necessary, sulfanilamide was added to the mixture. Slurries were then heated for approximately 20 min to collect a total of 50 mL distillate. A 5 mL aliquot of distillate was mixed with 5 mL 0.02M aqueous solution of TBA reagent in a 50 mL centrifuge tube and heated in a boiling water bath for 35 min. Optical density of the pink-colored chromogen so obtained was measured at 532 nm using either the Shimadzu UV-260 or Beckman DU-8 spectrophotometer. TBA numbers, in ppm, were calculated by multiplying measured optical densities by a factor of 8.1.

Hunter L, a, b color parameters of meat samples cooked with different additives, irradiated at 5 or 10 kGy and as a function of storage at 4° C. were compared with those of their nonirradiated counterparts (Table 26). Results indicated that all meat samples, regardless of chemical or radiation treatment, became less pinkish in their appearance due to storage. Thus, their Hunter a values decreased over a 3-week storage period. For untreated meat samples which did not receive irradiation, a values followed an opposite, increasing trend. This increase may be due to presence of some sodium nitrate in the system which may gradually be converted to sodium nitrite and subsequently to nitric oxide, thus, leading to the formation of a slight amount of color in the product. Irradiation might have hastened the reducing potential of SA and thus freshly irradiated uncured samples had a higher Hunter a value as compared to their nonirradiated counterparts. Reduction of denatured metmyoglobin might have also taken place. It has been shown that oxidized, brown, surface color of vacuum packed meats turns purple upon irradiation whereas in the presence of oxygen, a bright red color develops. Irradiation had little effect on color fading characteristics of nitrite-cured meat samples as compared to their nonirradiated counterparts (as seen above in Table 26). However, freshly irradiated nitrite-cured meats had slightly lower Hunter a values. A similar observation was made for CCMP-treated meats. Thus, presence of residual nitrite may not be a determining factor in color stability of treated meats. A similar observation was made when CCMP-treated and nitrite-cured meats were subjected to fluorescent lighting.

Presence of STPP and SAPP had a slight detrimental effect on color stability of CCMP-treated meats. Thus, a larger decrease in Hunter a values was observed for irradiated, pigment-treated meats which contained polyphosphates. Although polyphosphates have been found to have a beneficial effect on color characteristics of cured and CCMP-treated meats, their color stability might be somewhat affected by irradiation.

Flavor and oxidative stability of irradiated meat samples containing different additives, as determined by their TBA numbers, are assembled in Table 27. The antioxidative effect of nitrite was somewhat enhanced in irradiated samples as smaller TBA values were obtained. Perhaps irradiation enhances conversion of nitrite to nitric oxide in presence of SA. TBA values of stored CCMP-treated meats, together with SA, were considerably smaller than those of controls with no additives (as seen below in Table 27).

TABLE 27

Effect of irradiation on the TBA values of cooked, treated meats.[1]

| Additive(s) | Irradiation Dose kGy | Storage Period, Days | | | |
|---|---|---|---|---|---|
| | | 0 | 7 | 14 | 21 |
| None | 0 | 4.55 ± 0.05$^{ay}$ | 6.23 ± 0.08$^{ax}$ | 6.02 ± 0.10$^{ax}$ | 8.41 ± 0.12$^{aw}$ |
| | 5 | 0.89 ± 0.07$^{cz}$ | 2.71 ± 0.10$^{cy}$ | 3.95 ± 0.12$^{cx}$ | 6.59 ± 0.06$^{bw}$ |
| | 10 | 1.39 ± 0.08$^{bz}$ | 3.17 ± 0.09$^{by}$ | 4.85 ± 0.02$^{bx}$ | 6.62 ± 0.05$^{bw}$ |
| NaNO$_2$ (156 ppm) | 0 | 0.21 ± 0.03$^{dy}$ | 0.83 ± 0.04$^{cw}$ | 0.84 ± 0.04$^{fgx}$ | 0.74 ± 0.02$^{cx}$ |
| | 5 | 0.18 ± 0.03$^{dy}$ | 0.56 ± 0.05$^{fgw}$ | 0.47 ± 0.02$^{hwx}$ | 0.43 ± 0.05$^{fx}$ |
| | 10 | 0.17 ± 0.02$^{dy}$ | 0.47 ± 0.03$^{gx}$ | 0.60 ± 0.05$^{hw}$ | 0.45 ± 0.04$^{fx}$ |
| CCMP (12 ppm) | 0 | 0.11 ± 0.03$^{dy}$ | 1.62 ± 0.04$^{dx}$ | 1.59 ± 0.01$^{ex}$ | 4.23 ± 0.02$^{cw}$ |
| | 5 | 0.13 ± 0.03$^{dy}$ | 1.61 ± 0.04$^{dx}$ | 1.67 ± 0.03$^{dex}$ | 2.21 ± 0.03$^{dw}$ |
| | 10 | 0.23 ± 0.02$^{dz}$ | 1.65 ± 0.05$^{dy}$ | 1.79 ± 0.04$^{dx}$ | 2.30 ± 0.08$^{dw}$ |
| CCMP (12 ppm) + STPP (3000 ppm) | 0 | 0.13 ± 0.04$^{dy}$ | 0.68 ± 0.03$^{efw}$ | 0.65 ± 0.02$^{ghw}$ | 0.32 ± 0.10$^{fgx}$ |
| | 5 | 0.15 ± 0.04$^{dy}$ | 0.52 ± 0.01$^{dx}$ | 0.62 ± 0.05$^{hw}$ | 0.23 ± 0.03$^{gx}$ |
| | 10 | 0.15 ± 0.03$^{dx}$ | 0.54 ± 0.03$^{fgw}$ | 0.53 ± 0.04$^{hw}$ | 0.22 ± 0.03$^{gx}$ |
| CCMP (12 ppm) + STPP (1500 ppm) + SAPP (1500 ppm) | 0 | 0.11 ± 0.04$^{dx}$ | 0.78 ± 0.03$^{cw}$ | 0.89 ± 0.08$^{fw}$ | 0.23 ± 0.09$^{gx}$ |
| | 5 | 0.18 ± 0.03$^{dx}$ | 0.60 ± 0.04$^{fgw}$ | 0.52 ± 0.03$^{hw}$ | 0.22 ± 0.10$^{gx}$ |
| | 10 | 0.19 ± 0.02$^{dx}$ | 0.58 ± 0.03$^{fgw}$ | 0.66 ± 0.07$^{ghw}$ | 0.26 ± 0.08$^{gx}$ |

[1]All samples contain 20% (w/w) distilled water and 550 ppm sodium ascorbate; CCMP, cooked cured-meat pigment; STPP, sodium tripolyphosphate; SAPP, sodium acid pyrophosphate. Means of 3 TBA determinations ± standard deviations. Means in the same column (a–h) or in the same row (w–z) with same superscripts are not different (P > 0.05).

Furthermore, irradiation had a beneficial effect in lowering TBA values of treated samples during a 3-week storage period. It has been reported that proteins and possibly protein-carbohydrate interaction products, exert an antioxidative effect that increases with radiation dose, thus protecting lipids in meats against radiation-induced oxidative changes. Both TBA and oxygen uptake studies indicated increased stability for irradiated meats. Moreover, a better oxidative stability for irradiated seafoods has been reported upon storage. Presence of STPP and SAPP had a beneficial effect in lowering TBA values and thus enhancing oxidative stability of treated samples. Furthermore, no irradiated odor was noticed in any samples tested in this study.

Irradiation had no detrimental effect on color and oxidative stabilities of either nitrite-cured or pigment-treated meat samples. Futhermore, treated samples are expected to have attained microbial stability due to irradiation. Thus, CCMP together with curing adjuncts such as ascorbates and polyphosphates and low-dose γ-irradiation presents another nitrite-free curing method. Its application, however, depends solely on acceptance of irradiation as a viable method of food preservation.

5) CONCLUSION

By the present invention, several composite meat curing systems devoid of nitrite were developed. Characteristic cured-meat color, as measured by Hunter L, a, b values, and flavor, as determined sensorially or by selected volatile component analysis, as well as extended shelf-life (oxidative and presumably microbial) of nitrite-cured meats were duplicated. Cured color was reproduced by use of CCMP prepared directly from hemoglobin (or its components via an enzymatic and/or a column separation process) in hopefully an industrially viable batch process. This pigment was further stabilized in food-grade matrices as forementioned. Entrapped pigment imparted the typical "cured" color to prepared frankfurters even after 18 months of storage for some wall material combinations. Flavor characteristics were duplicated by use of all-natural ingredients. Furthermore, shelf-life stability was achieved by use of natural or non-chemical methods. Antioxidant/flavorant ingredients used were all natural components/extracts. They were added to meats, prior to cooking at levels varying from 200 ppm to 2% (w/w), depending on their nature. Antimicrobial stability of treated samples was achieved, presumably, by several methods, including γ-irradiation.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What we claim is:

1. An encapsulated powdered cooked cured-meat pigment comprising a mononitric oxide complex of protoporphyrin (IX) Fe (II) compound derived from red blood cells, from a hemin intermediate or from a derivative thereof, said pigment being encapsulated within a treating mixture consisting of: (i) a carbohydrate-based wall material selected from the group consisting of starch, modified starches, a starch polymer, a starch derivative, maltodextrins, starch products, chitinous compounds, β-cyclodextrin and a modified β-cyclodextrin; (ii) a binding agent selected from the group consisting of gums and glycerin; and (iii) at least one member selected from the group consisting of a reducing agent and a sequestrant agent.

2. The encapsulated powdered cooked cured-meat pigment of claim 1 wherein said powdered cooked cured-meat pigment is produced by reaction of a hemin intermediate or a derivative thereof with a nitrosating agent and at least one reductant.

3. The encapsulated powdered cooked cured-meat pigment of claim 2, wherein said hemin intermediate or derivative thereof is provided by a process selected from one of the following: (a) extracting said hemin intermediate or derivative thereof from red blood cells using acidified salt solutions with or without an organic solvent; (b) obtaining said hemin intermediate or derivative thereof as a by-product in globin hydrolysate preparation; and (c) obtaining said hemin intermediate or derivative thereof by chromatographic separation through carboxymethylcellulose.

4. The cooked cured-meat pigment, or powdered cooked cured-meat pigment, of claim 2, wherein said nitrosating agent is selected from the group consisting of nitric oxide, a nitrite salt, a nitrate salt, and mixtures thereof.

5. The encapsulated powdered cooked cured-meat pigment of claim 1, wherein said member (iii) comprises a reducing agent selected from the group consisting of ascorbyl palmitate, ascorbic acid, erythorbic acid, ascorbyl palmitate+ascorbic acid, ascorbyl palmitate+erythorbic acid, and ascorbic acid+erythorbic acid, and salts thereof.

6. The encapsulated powdered cooked cured-meat pigment of claim 1, wherein said member (iii) comprises a sequestrant selected from the group consisting of butylated hydroxyanisole, butylated hydroxytoluene, t-butylhydroquinone, sodium tripolyphosphate, sodium pyrophosphate, sodium acid pyrophosphate, sodium hexametaphosphate, sodium ethylenediaminetetracetic acid, sodium tripolyphosphate+sodium ascorbate, sodium tripolyphosphate+sodium ascorbate+butylated hyroxyanisole, sodium tripolyphosphate+sodium ascorbate+t-butylhydroquinone, sodium pyrophosphate+sodium ascorbate, sodium acid pyrophosphate+sodium ascorbate, sodium hexa-metaphosphate+sodium ascorbate, and sodium acid pyrophosphate+sodium ascorbate+butylhydroquinone.

7. The encapsulated powdered cooked cured-meat pigment of claim 1, wherein said carbohydrate-based wall material in said treating mixture is selected from the group consisting of β-cyclodextrin, a modified β-cyclodextrin, a maltodextrin, a modified starch and mixtures thereof.

8. The encapsulated powdered cooked cured-meat pigment of claim 1, wherein said treating mixture (i)+(ii)+(iii) comprises at least two compounds selected from the group consisting of modified starches+gum acacia, modified starches+β-cyclodextrin, modified starches+β-cyclodextrin+gum acacia, modified starches+modified β-cyclodextrin+gum acacia, modified starches+sodium tripolyphosphate+sodium acid pyrophosphate+ascorbyl palmitate, modified starches+β-cyclodextrin+sodium tripolyphosphate+sodium acid pyrophosphate+ascorbyl palmitate, modified starches+β-cyclodextrin+gum acacia+sodium tripolyphosphate+sodium acid pyrophosphate+ascorbyl palmitate, β-cyclodextrin+gum acacia, β-cyclodextrin+sodium tripolyphosphate+sodium acid pyrophosphate, β-cyclodextrin+sodium tripolyphosphate+sodium acid pyrophosphate+ascorbyl palmitate, β-cyclodextrin+gum acacia+sodium tripolyphosphate+sodium acid pyrophosphate, a modified β-cyclodextrin+sodium tripolyphosphate+sodium acid pyrophosphate+ascorbyl palmitate, maltodextrins+sodium tripolyphosphate+sodium acid pyrophosphate+ascorbyl palmitate, maltodextrins+β-cyclodextrin+sodium tripolyphosphate+sodium acid pyrophosphate+ascorbyl palmitate, and maltodextrins+a modified β-cyclodextrin+sodium tripolyphosphate+sodium acid pyrophosphate+ascorbyl palmitate.

9. The encapsulated powdered cooked cured-meat pigment of claim 1, wherein said member (iii) further comprises an antimicrobial agent selected from the group consisting of sodium hypophosphite, potassium sorbate, fumarate esters, t-butylhydroquinone, sodium hypophosphite+sodium ascorbate+sodium tripolyphosphate+t-butylhydroquinone, potassium sorbate+sodium ascorbate+sodium tripolyphosphate+t-butylhydroquinone and monomethyl fumarate+sodium ascorbate+sodium tripolyphosphate+t-butylhydroquinone.

10. The encapsulated powdered cooked cured-meat pigment of claim 1, wherein said member (iii) further comprises an antioxidant selected from the group consisting of ascorbic acid, citric acid, $\alpha,\beta,\gamma$ or $\delta$ tocopherols, ascorbic acid+$\alpha,\beta,\gamma$ or $\delta$ tocopherols, and ascorbic acid+citric acid.

11. The encapsulated powdered cooked cured-meat pigment of claim 1, wherein said member (iii) further comprises a plant phenolic compound selected from the group consisting of ellagic acid, eugenol, isoeugenol, quercetin, kaempferol, rutin, cinnamic acid, coumaric acid, ferulic acid, caffeic acid, vanillic acid, gallic acid, syringic acid, chlorogenic acid and 3,5-dimethoxy-4-hydroxycinnamic acid.

12. The encapsulated powdered cooked cured-meat pigment of claim 1, wherein said member (iii) further comprises a spice or a spice oleoresin selected from the group consisting of clove, sage, rosemary, oregano, thyme, ginger, clove oleoresin, oregano oleoresin, sage oleoresin, ginger oleoresin, thyme oleoresin and rosemary oleoresin.

13. The encapsulated powdered cooked cured-meat pigment of claim 1, treated with low- to medium-dose gamma- or electron-irradiation of up to about 50 kGy.

14. The encapsulated powdered cooked cured-meat pigment of claim 1, which is preserved and stored in a dark container in an atmosphere selected from the group consisting of an oxygen-free atmosphere, an inert gas atmosphere, and a mixture of inert gases.

15. The encapsulated powdered cooked cured-meat pigment of claim 1, which is preserved and stored in a dark container under vacuum or reduced pressure.

16. The encapsulated powdered cooked cured-meat pigment of claim 1, which is preserved and stored in a dark container kept at room temperature, at a refrigerated temperature or at a frozen temperature.

17. The encapsulated powdered cooked cured-meat pigment of claim 1 wherein (iii) comprises a mixture of a reducing agent and a sequestrant.

* * * * *